(12) United States Patent
Saari et al.

(10) Patent No.: US 8,780,356 B1
(45) Date of Patent: Jul. 15, 2014

(54) METHOD FOR DETERMINING CALIBRATION PARAMETERS FOR A SPECTROMETER

(71) Applicant: Teknologian Tutkimuskeskus VTT, Espoo (FI)

(72) Inventors: Heikki Saari, Espoo (FI); Jussi Mäkynen, Espoo (FI); Christer Holmlund, Espoo (FI); Uula Kantojärvi, Espoo (FI); Jarkko Antila, Espoo (FI); Rami Mannila, Espoo (FI)

(73) Assignee: Teknologian Tutkimuskeskus VTT, Espoo (FI)

( * ) Notice: Subject to any disclaimer, the term of this patent is extended or adjusted under 35 U.S.C. 154(b) by 0 days.

(21) Appl. No.: 14/049,636

(22) Filed: Oct. 9, 2013

(30) Foreign Application Priority Data

Oct. 11, 2012 (FI) .................................... 20126066

(51) Int. Cl.
- *G01J 3/45* (2006.01)
- *H04N 9/73* (2006.01)
- *H04N 17/02* (2006.01)

(52) U.S. Cl.
CPC ............... *H04N 9/735* (2013.01); *H04N 17/02* (2013.01); *G01J 3/45* (2013.01)
USPC ......................................................... 356/454

(58) Field of Classification Search
CPC .......... G01B 9/02005; G01B 9/02072; G01B 9/02074; G01B 2290/25; G01D 5/35312; G01J 3/26; G01J 3/453; G01J 2003/453
USPC ......................................................... 356/454
See application file for complete search history.

(56) References Cited

U.S. PATENT DOCUMENTS

| 6,504,616 B1 | 1/2003 | Haber | |
|---|---|---|---|
| 2006/0221346 A1* | 10/2006 | Mestha et al. | 356/454 |

(Continued)

FOREIGN PATENT DOCUMENTS

| GB | 2445956 A | 7/2008 |
|---|---|---|
| JP | 2004177147 A | 6/2004 |

(Continued)

OTHER PUBLICATIONS

Extended European Search Report; EP Application No. 13397532.6; Jan. 20, 2014.

(Continued)

*Primary Examiner* — Tarifur Chowdhury
*Assistant Examiner* — Jonathon Cook
(74) *Attorney, Agent, or Firm* — Ziegler IP Law Group, LLC.

(57) ABSTRACT

An imaging spectrometer includes a Fabry-Perot interferometer and an image sensor having color-sensitive pixels. The interferometer has a first transmission peak and a second transmission peak (PEAK2). A method calibrating the spectrometer includes providing first calibration light, which has a narrow spectral peak, obtaining first detector signal values from the image sensor by coupling the first calibration light into the spectrometer when the reference spectral peak is near a first spectral position, obtaining second detector signal values from the image sensor by coupling the first calibration light into the spectrometer when the reference spectral peak is near a second spectral position, providing second calibration light, which has a broad bandwidth, and obtaining third detector signal values from the image sensor by coupling the second calibration light into the spectrometer.

12 Claims, 14 Drawing Sheets

(56) References Cited

U.S. PATENT DOCUMENTS

| | | | |
|---|---|---|---|
| 2007/0165235 A1* | 7/2007 | Haridas | 356/451 |
| 2010/0250182 A1 | 9/2010 | Matsumoto | |
| 2012/0188538 A1* | 7/2012 | Patil et al. | 356/301 |

FOREIGN PATENT DOCUMENTS

| | | |
|---|---|---|
| JP | 2007135244 A | 5/2007 |
| JP | 2009281929 A | 12/2009 |
| JP | 2010249808 A | 11/2010 |
| JP | 2011082886 A | 4/2011 |
| WO | 2007/135244 A2 | 11/2007 |
| WO | 2007135244 A2 | 11/2007 |
| WO | 2010/040570 A1 | 4/2010 |

OTHER PUBLICATIONS

Office Action, FI-20126066, National Board of Patents and Registration of Finland; Jul. 2, 2013.

* cited by examiner

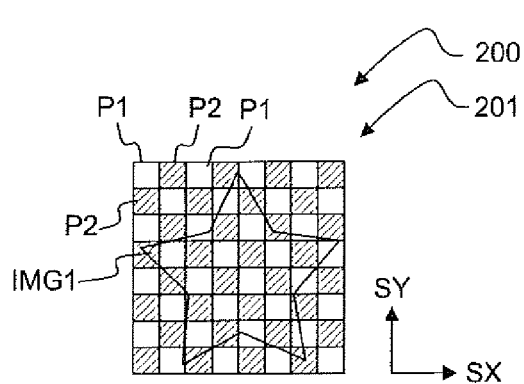 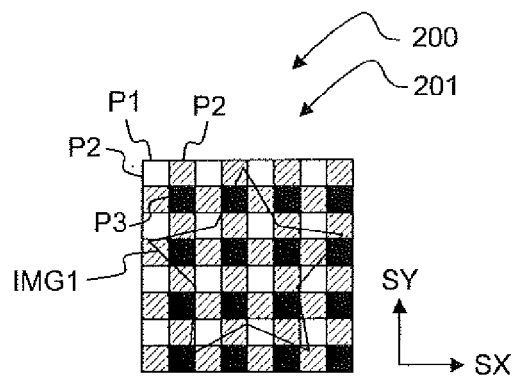
Fig. 2a Fig. 2b
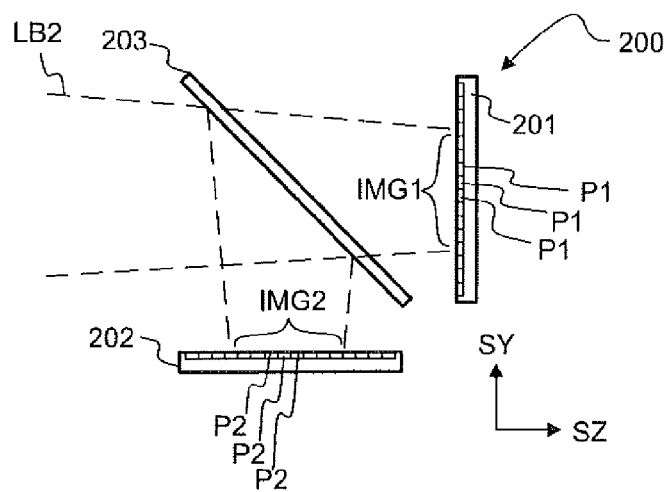
Fig. 2c
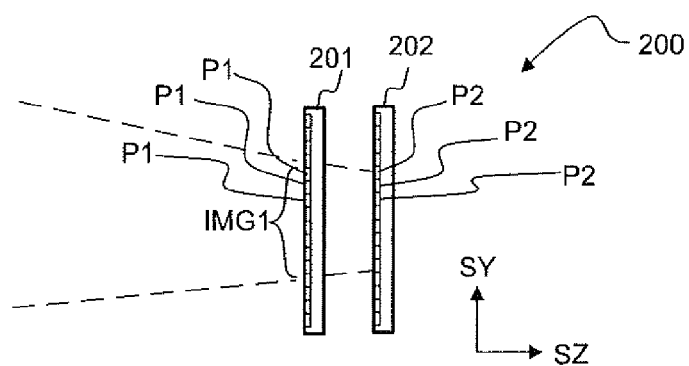
Fig. 2d

MPEAK

METHOD FOR DETERMINING CALIBRATION PARAMETERS FOR A SPECTROMETER

FIELD

The aspects of the present disclosure relate to spectral analysis.

BACKGROUND

It is known that a digital camera may comprise a Bayer filter for separating colors into red, green and blue spectral components. The color balance of the digital camera may be calibrated by capturing an image of a test object.

SUMMARY

An aspect of the present disclosure is to provide a method for calibrating a spectrometer. An aspect of the present disclosure is to provide a method for using the spectrometer. An aspect of the present disclosure is to provide a computer program for calibrating a spectrometer. An aspect of the present disclosure is to provide a computer program product storing computer program for calibrating a spectrometer.

According to a first aspect of the present disclosure, there is provided a method for determining calibration parameters for a spectrometer, wherein the spectrometer comprises a Fabry-Perot interferometer having an adjustable mirror gap, and an image sensor, the image sensor comprises a plurality of first pixels and a plurality of second pixels, the pixels are arranged to detect light transmitted through the Fabry-Perot interferometer, the first pixels have a first sensitivity function, the second pixels have a second different sensitivity function, the Fabry-Perot interferometer has a first transmission peak and a second transmission peak, the first pixels are arranged to detect light at the spectral position of the first transmission peak and the at the spectral position of the second transmission peak, the method comprising:
providing first calibration light, which has a reference spectral peak at an adjustable spectral position,
obtaining first detector signal values from the image sensor by coupling the first calibration light into the spectrometer when the reference spectral peak is substantially at a first spectral position,
obtaining second detector signal values from the image sensor by coupling the first calibration light into the spectrometer when the reference spectral peak is substantially at a second spectral position,
determining a first group of calibration parameters from the first detector signal values and from the second detector signal values,
providing second calibration light, wherein the spectral width of a spectral band of the second calibration light is broader than the spectral width of the reference spectral peak,
obtaining third detector signal values from the image sensor by coupling the second calibration light into the spectrometer, and
determining a second group of calibration parameters from the third detector signal values and from the first group of calibration parameters.

According to a second aspect of the present disclosure, there is provided a computer program product embodied on a non-transitory computer readable medium, comprising computer program code for determining calibration parameters of a spectrometer, wherein the spectrometer comprises a Fabry-Perot interferometer having an adjustable mirror gap, and an image sensor, the image sensor comprises a plurality of first pixels and a plurality of second pixels, the pixels are arranged to detect light transmitted through the Fabry-Perot interferometer, the first pixels have a first sensitivity function, the second pixels have a second different sensitivity function, the Fabry-Perot interferometer has a first transmission peak and a second transmission peak, the first pixels are arranged to detect light at the spectral position of the first transmission peak and the at the spectral position of the second transmission peak, wherein the computer program code is configured to, when executed on at least one processor, cause an apparatus or a system to:
provide first calibration light, which has a reference spectral peak at an adjustable spectral position,
obtain first detector signal values from the image sensor by coupling the first calibration light into the spectrometer when the reference spectral peak is substantially at a first spectral position,
obtain second detector signal values from the image sensor by coupling the first calibration light into the spectrometer when the reference spectral peak is substantially at a second spectral position,
determine a first group of calibration parameters from the first detector signal values and from the second detector signal values,
provide second calibration light, wherein the spectral width of a spectral band of the second calibration light is broader than the spectral width of the reference spectral peak,
obtain third detector signal values from the image sensor by coupling the second calibration light into the spectrometer, and
determine a second group of calibration parameters from the third detector signal values and from the first group of calibration parameters.

A method calibrating the spectrometer (500) may comprise:
providing first calibration light (LB11), which has a narrow spectral peak (MPEAK),
obtaining first detector signal values ($S_R(\lambda_0)$ $S_G(\lambda_0)$) from the image sensor (200) by coupling the first calibration light (LB11) into the spectrometer (500) when the reference spectral peak (MPEAK) is near a first spectral position ($\lambda_0$),
obtaining second detector signal values ($S_R(\lambda_1)$ $S_G(\lambda_1)$) from the image sensor (200) by coupling the first calibration light (LB11) into the spectrometer (500) when the reference spectral peak (MPEAK) is near a second spectral position ($\lambda_1$),
providing second calibration light (LB20), which has broader bandwidth than the first calibration light (LB11),
obtaining third detector signal values ($S_R$, $S_G$) from the image sensor (200) by coupling the second calibration light (LB20) into the spectrometer (500),
determining first calibration parameters (Q) from the first detector signal values ($S_R(\lambda_0)$ $S_G(\lambda_0)$) and the second detector signal values ($S_R(\lambda_1)$ $S_G(\lambda_1)$), and
determining second calibration parameters (R) from the third detector signal values ($S_R$, $S_G$, $S_B$) and from the first calibration parameters (Q).

A method calibrating the spectrometer (500) may comprise:
providing first calibration light (LB11), which has a reference spectral peak (MPEAK) at an adjustable spectral position ($\lambda_M$),
obtaining first detector signal values ($S_R(\lambda_0)$ $S_G(\lambda_0)$) from the image sensor (200) by coupling the first calibration light (LB11) into the spectrometer (500) when the reference spectral peak (MPEAK) is substantially at a first spectral position ($\lambda_0$), obtaining second detector signal values ($S_R(\lambda_1)$ $S_G(\lambda_1)$) from the image sensor (200) by coupling the first calibration light (LB11) into the spectrometer (500) when the reference spectral peak (MPEAK) is substantially at a second spectral position ($\lambda_1$), determining a first group (Q) of calibration parameters from the first detector signal values ($S_R(\lambda_0)$ $S_G(\lambda_0)$) and the second detector signal values ($S_R(\lambda_1)$ $S_G(\lambda_1)$), providing second calibration light (LB20), wherein the bandwidth ($\Delta\lambda_{FWHM,20}$) of the second calibration light (LB20) is broader than the spectral width ($\Delta\lambda_{FWHM,M}$) of the reference spectral peak (MPEAK), obtaining third detector signal values ($S_R$, $S_G$) from the image sensor (200) by coupling the second calibration light (LB20) into the spectrometer (500), and determining a second group (R) of calibration parameters from the third detector signal values ($S_R$, $S_G$) and from the first group of calibration parameters (Q).

When monitoring unknown spectrum at a later stage, the spectrometer may be arranged to obtain detector signal values from the image sensor, and to determine intensity values from the detector signal values by using the second group of calibration parameters The spectrometer may comprise a Fabry-Perot interferometer and an image sensor. The Fabry-Perot interferometer comprises a first semi-transparent mirror and a second semi-transparent mirror, which are arranged to form an optical cavity. The Fabry-Perot interferometer may provide two or more transmission peaks. Spectral components transmitted at different transmission peaks of the interferometer may be discriminated by using at least two types of detector pixels, which have maximum sensitivities at different wavelengths.

The spectral position of the transmission peaks may be changed e.g. by changing the distance between the mirrors. The spectral position of the transmission peaks may be changed by changing the distance between the mirrors. The distance between mirrors may be called as the mirror gap. The Fabry-Perot interferometer may have adjustable mirror gap. The mirror gap may be adjusted e.g. by using a piezoelectric actuator.

The two or more transmission peaks may be matched with the spectral sensitivities of the detector pixels of the image sensor so that the spectrometer can be used for fast spectral analysis at high spectral resolution. The spectrometer may measure spectral intensities e.g. at two, three, four or five wavelengths substantially simultaneously. The spectrometer may be arranged to form an image of an object on the image sensor, and spectral intensities may be measured substantially simultaneously for two or more different parts of the object. The spectrometer may capture a two-dimensional image of an object at two or more narrow wavelength bands (i.e. transmission peaks) of the Fabry-Perot interferometer.

By using the spectrometer, spectral intensities may be measured rapidly. By using the spectrometer, more spectral information may be gathered from an object.

For accurate measurements, the spectrometer may need to be calibrated. The calibration may comprise coupling narrowband calibration light into the spectrometer, and coupling broadband calibration light into the spectrometer.

The wavelength of the narrowband calibration light may be varied during the calibration.

In an embodiment, the calibration may comprise coupling substantially monochromatic calibration light into the spectrometer, and scanning the wavelength of the monochromatic calibration light over the relevant spectral range without changing the mirror gap. The narrowband calibration light may be provided e.g. by filtering light of tungsten halogen lamp by using a scanning monochromator. The wavelength may be scanned over a predetermined range, e.g. from 500 nm to 900 nm, or from 400 nm to 760 nm. After the predetermined wavelength range has been scanned, the mirror gap may be slightly changed. The scanning of the wavelength of the monochromator may be subsequently repeated for each relevant mirror gap value.

In an embodiment, the calibration may comprise coupling substantially monochromatic calibration light into the spectrometer, and scanning the mirror gap value, without changing the wavelength of the monochromatic calibration light. The step for scanning the mirror gap may be selected such that the corresponding shift of a transmission peak is in the range of 0.1 nm to 20 nm. After the relevant range of mirror gap values has been scanned, the wavelength of the monochromatic calibration light may be changed. The scanning of the mirror gap values may be repeated for each relevant wavelength of the monochromatic calibration light.

A group of preliminary calibration parameters may be determined from detector signal values obtained from the image sensor during calibration with the narrowband light. The calibration with the narrowband light may also allow checking and/or calibrating the spectral positions of the transmission peaks of the Fabry-Perot interferometer. The preliminary calibration parameters may comprise e.g. element values of a matrix Q (see e.g. equation 4a).

The calibration may further comprise coupling broadband calibration light into the spectrometer. The broadband calibration light may be provided e.g. from a tungsten halogen lamp. The preliminary calibration parameters may be modified by using known spectral intensities of the broadband calibration light. Calibration parameters may be determined for a first mirror gap value and for a second different mirror gap value. Calibration with the broadband calibration light may be carried out for each relevant mirror gap value.

The calibration phase where narrowband calibration light is used may provide wavelength calibration in addition to intensity calibration. However, the calibration parameters determined by using the narrowband calibration light may be only approximate, and the calibration by using the narrowband calibration light may be time-consuming. Calibration with broadband calibration light may be carried fast and it may improve the accuracy of the calibration parameters.

In an embodiment, calibration with the narrowband light is carried out only once during the lifetime of a spectrometer, wherein calibration with the broadband calibration light may be carried out e.g. on each day or on each month.

In an embodiment, only one spectrometer of a manufacturing batch is calibrated by using the narrowband light, wherein calibration parameters determined by using the narrowband light may be utilized for other spectrometers of the manufacturing batch. The calibration of each spectrometer of the manufacturing batch may be supplemented by using the broadband light for calibration of said spectrometer.

BRIEF DESCRIPTION OF THE DRAWINGS

In the following examples, the embodiments of the present disclosure will be described in more detail with reference to the appended drawings, in which
FIG. 2a shows an image sensor,
FIG. 2b shows an image sensor,
FIG. 2c shows an image sensor comprising a first detector array and a second detector array,
FIG. 2d shows an image sensor comprising a first detector array superimposed on a second detector array.

DETAILED DESCRIPTION

Figure 1:
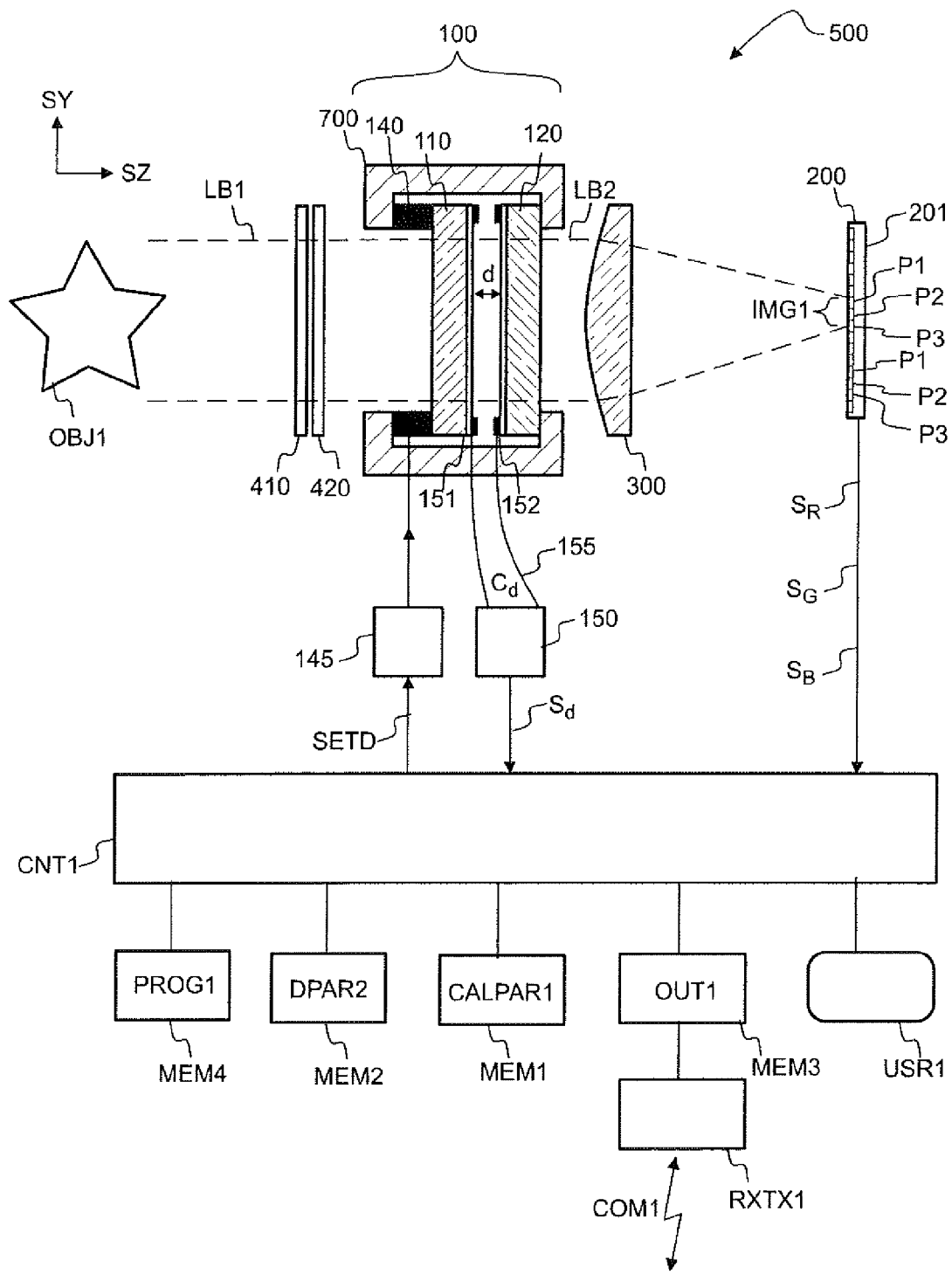
FIG. 1 shows a spectrometer.

Referring to FIG. 1, a spectrometer 500 may comprise an image sensor 200 and a Fabry-Perot interferometer 100. An object OBJ1 may reflect, emit and/or transmit light LB1, which may be coupled into the spectrometer 500 in order to monitor the spectrum of the light LB1. The spectrometer 500 may be used for measuring reflection, transmission (absorption) and/or emission of the object OBJ1.

The Fabry-Perot interferometer 100 comprises a first semi-transparent mirror 110 and a second semi-transparent mirror 120. The distance between the first mirror 110 and the second mirror 120 is equal to a mirror gap d. The mirror gap d may be adjustable.

Figure 5A:
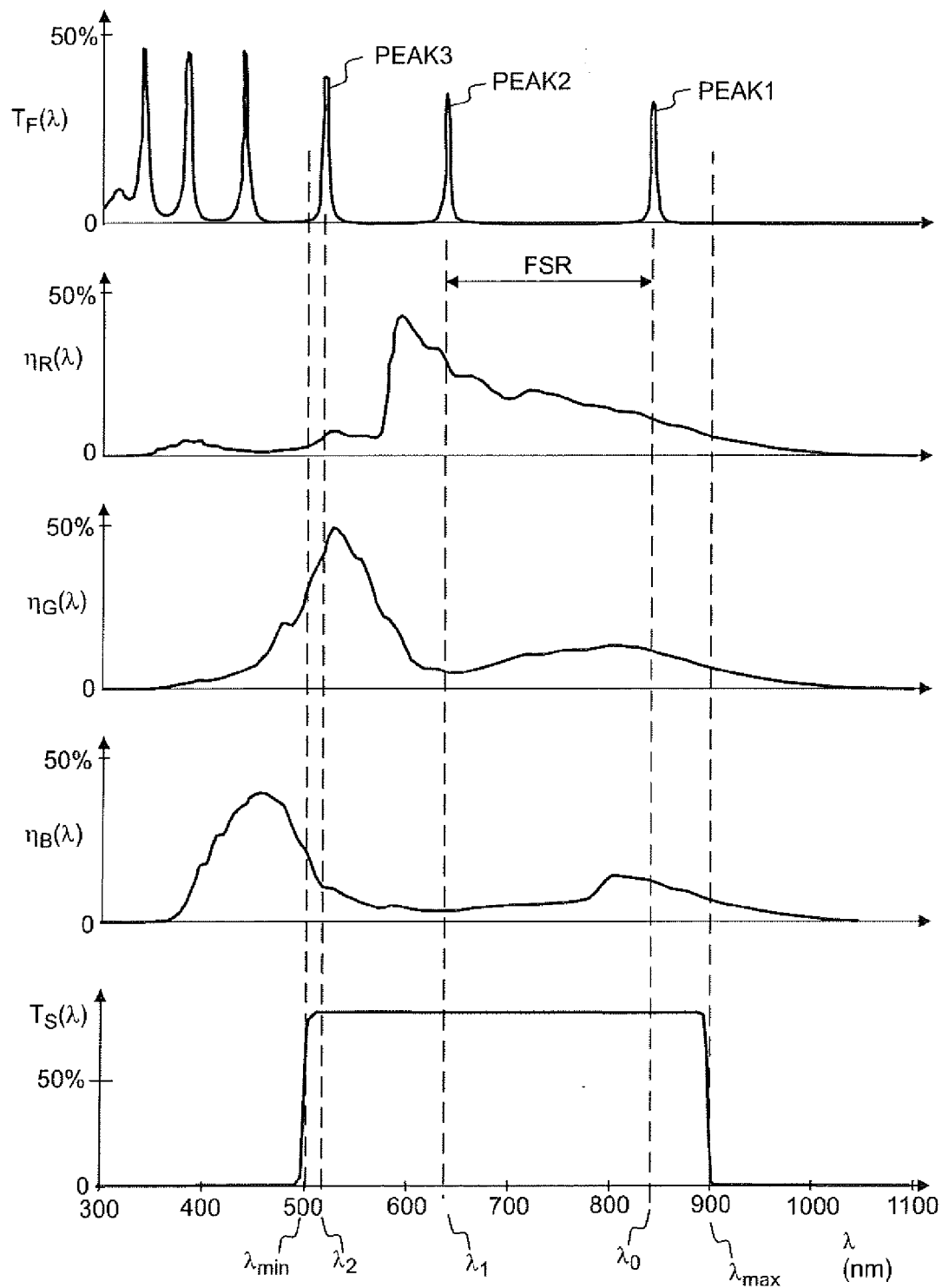
FIG. 5a shows, by way of example, spectral passbands and spectral sensitivity functions of the spectrometer.

The Fabry-Perot interferometer 100 may provide two or more transmission peaks, wherein the spectral positions of the transmission peaks may depend on the mirror gap d (see e.g. FIG. 5a). The spectral positions of the transmission peaks may be changed by changing the mirror spacing d. The transmission peaks may also be called passbands of the Fabry-Perot interferometer.

The Fabry-Perot interferometer 100 may form transmitted light LB2 by filtering the light LB1. The interferometer 100 may be optically coupled to the image sensor 200. The transmitted light LB2 may be form an image IMG1, which is captured by the image sensor 200. The transmitted light LB2 may impinge on the image sensor 200.

An actuator 140 may be arranged to move the first mirror 110 with respect to the second mirror 120. The actuator 140 may be e.g. a piezoelectric actuator. The mirrors 110, 120 may be substantially planar and substantially parallel to each other. The semi-transparent mirrors 110, 120 may comprise e.g. a metallic reflective layer and/or a reflective dielectric multilayer. One of the mirrors 110, 120 may be attached to a frame 700, and the other mirror may be moved by the actuator 140.

The spectrometer 500 may comprise a control unit CNT1. The control unit CNT1 may be arranged to send a control signal SETD to the interferometer 100 in order to adjust the mirror spacing d. The interferometer 100 may comprise a driver unit 145. The driver unit 145 may e.g. convert a digital signal SETD into an analog signal suitable for driving the actuator 140. The driver unit 145 may provide e.g. a high voltage signal for driving a piezoelectric actuator 140.

The spectrometer 500 may comprise capacitor plates 151, 152 for monitoring the actual mirror gap value d. The capacitor plates 151, 152 may together form a capacitance $C_d$. The capacitor plate 151 may be attached to the first mirror 110, and the second capacitor plate 152 may be attached to the second mirror 120. The value of the capacitance $C_d$ may be indicative of the mirror spacing d. The capacitor plates 151, 152 may be connected to a capacitance monitoring unit 150 e.g. by conductors 155. The capacitance monitoring unit 150 may provide a feedback signal $S_d$ indicative of the capacitance $C_d$ of the plates 151, 152. The capacitance monitoring unit 150 may provide a feedback signal $S_d$ indicative of the mirror spacing d.

The spectrometer 500 may comprise imaging optics 300. The imaging optics 300 may be arranged to form one or more two-dimensional optical images IMG1, IMG2 of the object OBJ1 on the image sensor 200. In particular, the imaging optics 300 may be arranged to focus light LB2 to the image sensor 200. The imaging optics 300 may comprise e.g. one or more refractive lenses and/or one or more reflective surfaces (e.g. a paraboloid reflector). The imaging optics 300 may be positioned e.g. between the interferometer 100 and the image sensor 200 and/or between the object OBJ1 and the interferometer 100. One or more components of the imaging optics 300 may also be positioned before the interferometer 300 and one or more components of the imaging optics 300 may be positioned after the interferometer 300.

The image sensor 200 may convert the one or more optical images IMG1, IMG2 into a digital image, which comprises a plurality of detector signals $S_R$, $S_G$, $S_B$ obtained from the image sensor 200. The digital image may be a two-dimensional digital color image. The image sensor 200 may be arranged to capture the digital image of the object OBJ1. The spectrometer 500 may be arranged to form the image IMG1 of the object OBJ1 on the image sensor 200, and spectral intensities may be measured substantially simultaneously for two or more different parts of the object OBJ1, without a need to change the orientation of the spectrometer 500 with respect to the object OBJ1. The spectrometer may capture a two-dimensional image IMG1 of the object OBJ1 at two or more wavelength bands (i.e. transmission peaks PEAK1, PEAK2) of the Fabry-Perot interferometer 100.

The image sensor 200 may comprise a two-dimensional array of light-detecting pixels P1, P2, P3 (see FIGS. 2a and 2b). The image sensor 200 may comprise a first two-dimensional array of light-detecting pixels P1, and a second two-dimensional array of light-detecting pixels P2 (see FIG. 2c, 2d). The two-dimensional array of light-detecting pixels may also be called as a detector array.

The detector array may be e.g. a CMOS image sensor Complementary Metal Oxide Semiconductor) or a CCD image sensor (Charge Coupled Device). SX, SY and SZ denote orthogonal directions. The light LB2 may propagate substantially in the direction SZ. The image sensor 200 may be substantially parallel to a plane defined by the directions SX and SY.

The image sensor 200 may be sensitive e.g. in the ultraviolet, visible and/or infrared region. The spectrometer 500 may be arranged to measure spectral intensities e.g. in the ultraviolet, visible and/or infrared region.

The spectrometer 500 may comprise a memory MEM1 for storing calibration parameters CALPAR1. One or more intensity values of the light LB1 may be determined from the detector signals $S_R$, $S_G$, $S_B$ by using the calibration parameters CALPAR1. The calibration parameters CALPAR1 may comprise e.g. a matrix R, wherein intensity values may be calculated from measured detector signal values by using the matrix R (see equation 9c).

The feedback signal $S_d$ may be used for monitoring the true value of the mirror gap d. The response of the spectrometer 500 may have been calibrated as a function of the mirror gap d for each type of pixels P1, P2, P3. The spectrometer 500 may comprise a memory MEM2 for storing calibration parameters DPAR2. The actual mirror gap value d may be determined from the feedback signal value $S_d$ e.g. by using the calibration parameters DPAR2.

The spectrometer 500 may optionally comprise a memory MEM3 for storing output OUT1. The output OUT1 may comprise e.g. detector signals $S_R$, $S_G$, $S_B$ and/or intensity values determined from the detector signals $S_R$, $S_G$, $S_B$. The output OUT1 may comprise one or more digital images of the object OBJ1.

The spectrometer 500 may be arranged to obtain detector signal values $S_R$, $S_G$, $S_B$ from the image sensor 200, and to determine intensity values $X_n$, $X_{n+1}$ from the detector signal values $S_R$, $S_G$, $S_B$ by using calibration parameters CALPAR1 (e.g. matrix R). The spectrometer 500 may be arranged to compare a measured intensity value $X_n$ with a reference value or to compare a ratio of measured intensity values $X_n/X_{n+1}$ with a reference value. The spectrometer 500 may comprise a memory MEM4 for storing a computer program PROG1. The computer program PROG1 may be configured, when executed by one or more data processors (e.g. CNT1), to obtain detector signal values $S_R$, $S_G$, $S_B$ from the image sensor 200, and to determine intensity values $X_n$, $X_{n+1}$ from the detector signal values $S_R$, $S_G$, $S_B$ by using calibration parameters CALPAR1 (e.g. matrix R).

The spectrometer 500 may optionally comprise a user interface USR1 e.g. for displaying information and/or for receiving commands. The user interface USR1 may comprise e.g. a display, a keypad and/or a touch screen.

The spectrometer 500 may optionally comprise a communication unit RXTX1. The communication unit RXTX1 may transmit and/or receive a signal COM1 e.g. in order to receive commands, to receive calibration data, and/or to send output data OUT1. The communication unit RXTX1 may be capable of wired and/or wireless communication. The communication unit RXTX1 may be capable of communicating with a local wireless network (WLAN), with the Internet and/or with a mobile telephone network.

The spectrometer 500 may be implemented as a single physical unit or as a combination of separate units. In an embodiment, the units 100, CNT1, MEM1, MEM2, MEM3, MEM4, USR1, RXTX1 may be implemented in the same housing. In an embodiment, the units 100, 200 may be remote from the units CNT1, MEM1, MEM2, MEM3, MEM4, USR1, RXTX1. In particular, a first mobile device may comprise the units 100, 200, and the first mobile device may be arranged to communicate detector signals $S_R$, $S_G$, $S_B$ to a second device via a radio link. The second mobile device may comprise the units CNT1, MEM1 for determining intensity values from the detector signals $S_R$, $S_G$, $S_B$ received from the first mobile device.

The spectrometer 500 may optionally comprise one or more optical cut-off filters 410, 420 to limit the spectral response of the image sensor 200. The filters 410, 420 may define the spectral range of the spectrometer 500. The filters 410, 420 may be positioned before and/or after the interferometer 500.

The spectrometer 500 may optionally comprise e.g. a lens and/or an aperture, which is arranged to limit the divergence of the light LB2 transmitted through the interferometer 100, in order to provide a narrow bandwidth for the transmission peaks PEAK1, PEAK2. The divergence of the light LB2 may be limited to be e.g. smaller than or equal to 5 degrees. The divergence of light LB2 contributing to the spectral measurement may also be limited by the dimensions of the image sensor 200.

FIGS. 2a and 2b show an optical image IMG1 of the object OBJ1 formed on a detector array 201 of an image sensor 200. The imaging optics 300 of the spectrometer 500 may form an image IMG1 of the object OBJ1 on the detector array 201. The optical image IMG1 may simultaneously cover a plurality of detector pixels P1, P2 in order to analyze spatial variations of optical spectrum at different points of the two-dimensional image IMG1. The image IMG1 may cover e.g. four or more adjacent pixels P1,P2 in the direction SX, and four or more adjacent pixels in the direction SY.

Referring to FIG. 2a, the detector array 201 may comprise a plurality of light-detecting pixels P1, P2. The image sensor 200 may comprise e.g. two types of pixels P1, P2 wherein the first pixels P1 may have a first spectral sensitivity $\eta_R(\lambda)$, and the second pixels P2 may have a second different spectral sensitivity $\eta_G(\lambda)$. The first spectral sensitivity $\eta_R(\lambda)$ and the second spectral sensitivity $\eta_G(\lambda)$ may be selected such that the second spectral sensitivity $\eta_G(\lambda)$ cannot be provided by multiplying the first spectral sensitivity $\eta_1(\lambda)$ with a constant. In other words, the first pixels P1 and the second pixels P2 may be sensitive to different colors. The spectral sensitivities $\eta_R(\lambda)$, $\eta_G(\lambda)$ may be implemented e.g. by positioning an array of miniature optical filters over an array of light detectors. The pixels P1, P2 may be arranged e.g. according to a checkerboard pattern.

In an embodiment, the pixels P1 may be sensitive to e.g. red light only, and the pixels P2 may be sensitive to e.g. green light only.

In an embodiment, a first group of detector pixels P1 may be implemented without an optical filter, and a second group of detector pixels P2 may be implemented with an optical filter. For example, the pixels P1 may be sensitive to white light, and the pixels P2 may be sensitive to green and blue light but not to red light.

Referring to FIG. 2b, the image sensor 200 may comprise a plurality of light-detecting pixels P1, P2, P3 arranged e.g. in a Bayer matrix. The pixels P1 may be sensitive to red light, the pixels P2 may be sensitive to green light, and the pixels P3 may be sensitive to blue light. Image sensors of this type are commonly used in digital cameras.

Referring to FIG. 2c, the image sensor 200 may comprise a first detector array 201 and a second detector array 202. The first detector array 201 may comprise detector pixels P1, and the second detector array 202 may comprise detector pixels P2. The light LB2 may be distributed to the detector arrays 201, 202 by a beam splitter 203. The beam splitter 203 may be e.g. a dichroic mirror or a color separation prism. The image sensor 200 may be arranged to operate such that the first detector pixels P1 have the first spectral sensitivity $\eta_R(\lambda)$, and the second detector pixels P2 have the second different spectral sensitivity $\eta_G(\lambda)$. For example, the pixels P1 may have highest sensitivity to red light, the pixels P2 may be highest sensitivity to green light. The image sensor 200 may optionally comprise a second beam splitter 203 and a third detector array to implement detector pixels P3. The pixels P3 may have highest sensitivity to e.g. blue light.

Referring to FIG. 2d, the image sensor 200 may comprise detector arrays 201, 202 stacked on top of each other. In this case, the detector array 201 may semi-transparent.

A pixel P1 of an image sensor 200 may provide a detector signal value $S_R$. A pixel P2 of the image sensor 200 may provide a detector signal value $S_G$. A pixel P3 of the image sensor 200 may provide a detector signal value $S_B$.

Figure 3:
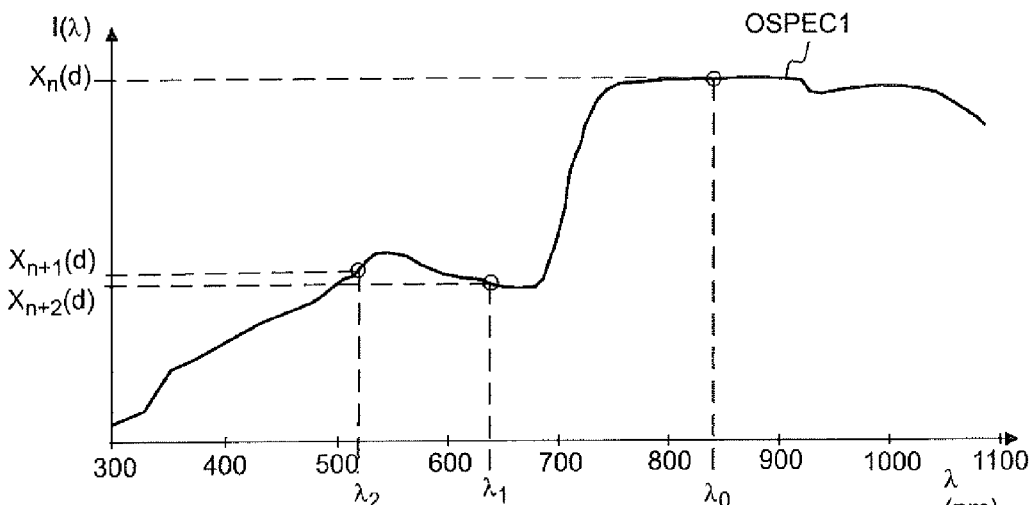
FIG. 3 shows, by way of example, spectrum of light received from an object.

FIG. 3 shows, by way of example, the spectral intensity $I(\lambda)$ of light LB1 received an object OBJ1. In particular, the curve OSPEC1 may represent the spectral intensity $I(\lambda)$ of light LB1 received from a certain point of the object OBJ1.

The spectral intensity $I(\lambda)$ may have a value $X_n$ at a wavelength $\lambda_0$, a value $X_{n+1}$ at a wavelength $X_1$, and a value $X_{n+2}$ at a wavelength $X_2$. The values $X_n$, $X_{n+1}$, $X_{n+2}$ may be measured by using the spectrometer 500. The values $X_n$, $X_{n+1}$, $X_{n+2}$ may be determined from detector signals $S_R$, $S_G$, $S_B$ obtained from the image sensor 200 by using the calibration parameters CALPAR1. The wavelengths $\lambda_0$, $\lambda_1$, $\lambda_2$ may be selected by adjusting the mirror gap d before obtaining the detector signals $S_R$, $S_G$, $S_B$. The notation $X_n(d)$ indicates that the value $X_n$ at the wavelength $\lambda_0$ may be measured by adjusting the mirror gap to the value d. The notation $X_{n+1}(d)$ indicates that the value $X_{n+1}$ at the wavelength $\lambda_1$ may be measured by adjusting the mirror gap to the value d. The notation $X_{n+2}(d)$ indicates that the value $X_{n+2}$ at the wavelength $\lambda_2$ may be measured by adjusting the mirror gap to a value d.

The mirror gap d may be kept substantially constant during a measurement in order to provide fast response. In other words, the mirror gap d does not need to be scanned. In particular, the mirror gap d may be kept substantially constant in order to simultaneously measure intensity values for light LB1 which has rapidly fluctuating intensity. The mirror gap d may be kept substantially constant in order to determine a ratio of intensity values for light LB1 which has rapidly fluctuating intensity.

The mirror gap d may also be scanned during a measurement in order to measure a wider spectrum of the object OBJ1.

The object OBJ1 may be a real object. The object OBJ1 may be e.g. in solid, liquid, or gaseous form. The object OBJ1 may be e.g. a plant (e.g. tree or a flower), a combustion flame, or an oil spill floating on water. The object may be e.g. the sun or a star observed through a layer of absorbing gas. The object OBJ1 may be an optical image formed by another optical device.

For example, the object OBJ1 may be e.g. a green plant, and the curve OSPEC1 may represent the reflectance spectrum of chlorophyll. For example, the ratio ($X_n/X_{n+1}$) of the values $X_n$, $X_{n+1}$ may be compared with a reference value in order to determine the condition of the plant. The plant may comprise several leaves, and the imaging property of the spectrometer 500 may be used e.g. to analyze the condition of each leaf of the plant without a need to change the orientation of the spectrometer 500.

Figure 4:
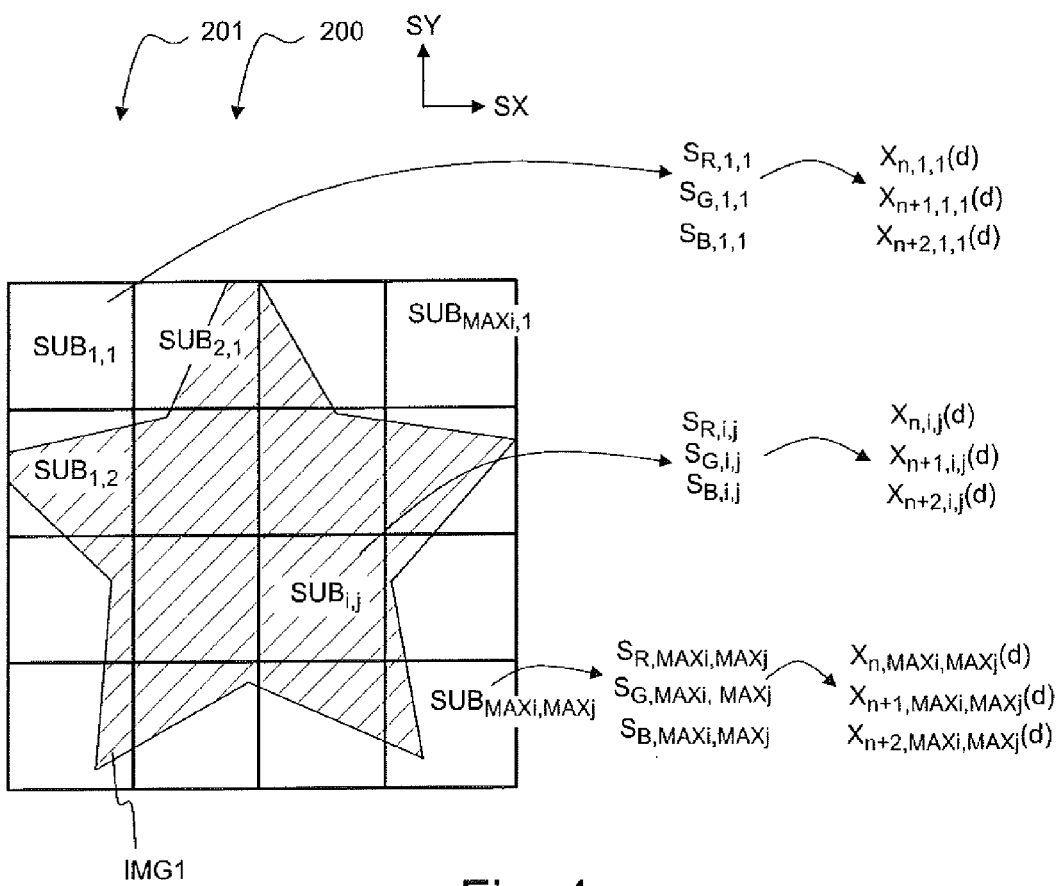
FIG. 4 shows portions of an image formed on the image sensor.

FIG. 4 shows an optical image IMG1 formed on a detector array 201 of an image sensor 200. The image area of the sensor 200 may be partitioned into two or more sensor portions $SUB_{1,1}$, ... $SUB_{i,j}$, ..., $SUB_{MAXi,MAXj}$. The sensor portions may be arranged e.g. in two or more rows and in two or more columns. The number of the columns may be equal to MAXi, and the number of rows may be equal to MAXj. For example 81 sensor portions may be arranged in 9 columns and 9 rows. The sensor portions may be non-overlapping or partially overlapping.

Detector pixels P1, P2, P3 of a first sensor portion $SUB_{1,1}$ may provide detector signals $S_{R,1,1}$, $S_{G,1,1}$, $S_{B,1,1}$. Detector pixels P1, P2, P3 of a second sensor portion $SUB_{i,j}$ may provide detector signals $S_{R,i,j}$, $S_{G,i,j}$, $S_{B,i,j}$. Detector pixels P1, P2, P3 of a third sensor portion $SUB_{MAXi,MAXj}$ may provide detector signals $S_{R,MAXi,MAXj}$, $S_{G,MAXi,MAXj}$, $S_{B,MAXi,MAXj}$.

A group of intensity values $X_n$, $X_{n+1}$, $X_{n+2}$ may be measured for each spatially different portion $SUB_{1,1}$, ... $SUB_{i,j}$, ..., $SUB_{MAXi,MAXj}$. Thus, light LB1 originating from different parts of the object OBJ1 may be analyzed separately.

A first group of intensity values $X_{n,1,1}$, $X_{n+1,1,1}$, $X_{n+2,1,1}$ may be determined from the detector signals $S_{R,1,1}$, $S_{G,1,1}$, $S_{B,1,1}$. A second group of intensity values $X_{n,i,j}$, $X_{n+1,i,j,1}$, $X_{n+2,i,j}$ may be determined from the detector signals $S_{R,i,j}$, $S_{G,i,j}$, $S_{B,i,j}$. A third group of intensity values $X_{n,MAXi,MAXj}$, $X_{n+1,MAXi,MAXj}$, $X_{n+2,MAXi,MAXj}$ may be determined from the detector signals $S_{R,MAXi,MAXj}$, $S_{G,MAXi,MAXj}$, $S_{B,MAXi,MAXj}$. The notations $X_{n,1,1}(d)$, $X_{n+1,1,1}(d)$, $X_{n+2,1,1}(d)$, $X_{n,i,j}(d)$, $X_{n+1,i,j,1}(d)$, $X_{n+2,i,j}(d)$, $X_{n,MAXi,MAXj}(d)$, $X_{n+1,MAXi,MAXj}(d)$, $X_{n+2,MAXi,MAXj}(d)$ indicate that the intensity values may be measured by adjusting the mirror gap to a value d.

The image sensor 200 may comprise one or more detector arrays 201, 202. The pixels P1, P2, P3 of each sensor portion $SUB_{i,j}$ may be located on the same detector array 201 or on different detector arrays 201, 202.

In an embodiment, calibration parameters (e.g. the matrix R) may be determined for each different sensor portion $SUB_{1,1}$, ... $SUB_{i,j}$, ..., $SUB_{MAXi,MAXj}$. Calibration parameters of a first sensor portion may slightly deviate from calibration parameters of a second sensor portion. Calibration parameters of a first sensor portion located at the center of the image sensor 200 may be different from calibration parameters of a second sensor portion located near the periphery of said image sensor 200.

FIG. 5a shows, by way of example, spectral transmittance and spectral sensitivity for different parts of the spectrometer 500.

The uppermost curve of FIG. 5a shows the spectral transmittance $T_F(\lambda)$ of the Fabry-Perot interferometer 100. The spectral transmittance $T_F(\lambda)$ may have adjacent transmittance peaks PEAK1, PEAK2, PEAK3 of the Fabry-Perot interferometer 100. A first transmittance peak PEAK1 may be at a wavelength $\lambda_0$, a second transmittance peak PEAK2 may be at a wavelength $\lambda_1$, and a third transmittance peak PEAK3 may be at a wavelength $\lambda_2$. The spectral positions $\lambda_0$, $\lambda_1$, $\lambda_2$ of the peaks PEAK1, PEAK2, PEAK3 may be shifted by changing the mirror gap d. The free spectral range FSR between adjacent peaks depends on the mirror gap d.

The second curve from the top shows spectral sensitivity $\eta_R(\lambda)$ of first pixels P1 of the image sensor 200. The third curve from the top shows spectral sensitivity $\eta_G(\lambda)$ of second pixels P2 of the image sensor 200. The fourth curve from the top shows spectral sensitivity $\eta_B(\lambda)$ of third pixels P3 of the image sensor 200. The first pixels P1 may be called e.g. red pixels, the second pixels P2 may be called e.g. as green pixels, and the third pixels may be called e.g. as blue pixels.

The spectrometer 500 may optionally comprise one or more optical cut-off filters 410, 420 to limit the spectral response of the spectrometer 500. The one or more filters 410, 420 may together provide a spectral transmittance $T_S(\lambda)$. The spectral transmittance $T_S(\lambda)$ may have a pass band $T_S(\lambda)$, which in turn may have cut-off wavelengths $\lambda_{min}$ and/or $\lambda_{max}$. The optical filters 410, 420 may be omitted e.g. when the detector pixels are not sensitive to light outside the range refined by the wavelengths $\lambda_{min}$ and $\lambda_{max}$. The optical filters 410, 420 may be omitted when the light LB1 received from the object OBJ1 does not contain spectral components at wavelengths outside the range refined by the wavelengths $\lambda_{min}$ and $\lambda_{max}$.

When the image sensor 200 comprises pixels P1, P2, P3 having three (or more) different sensitivity curves, the cut-off wavelengths $\lambda_{min}$ and $\lambda_{max}$ and the mirror gap d may be selected such that the spectral range defined by the wavelengths $\lambda_{min}$ and $\lambda_{max}$ contains only three transmission peaks PEAK1, PEAK2, PEAK3 of the Fabry-Perot interferometer.

Figure 5B:
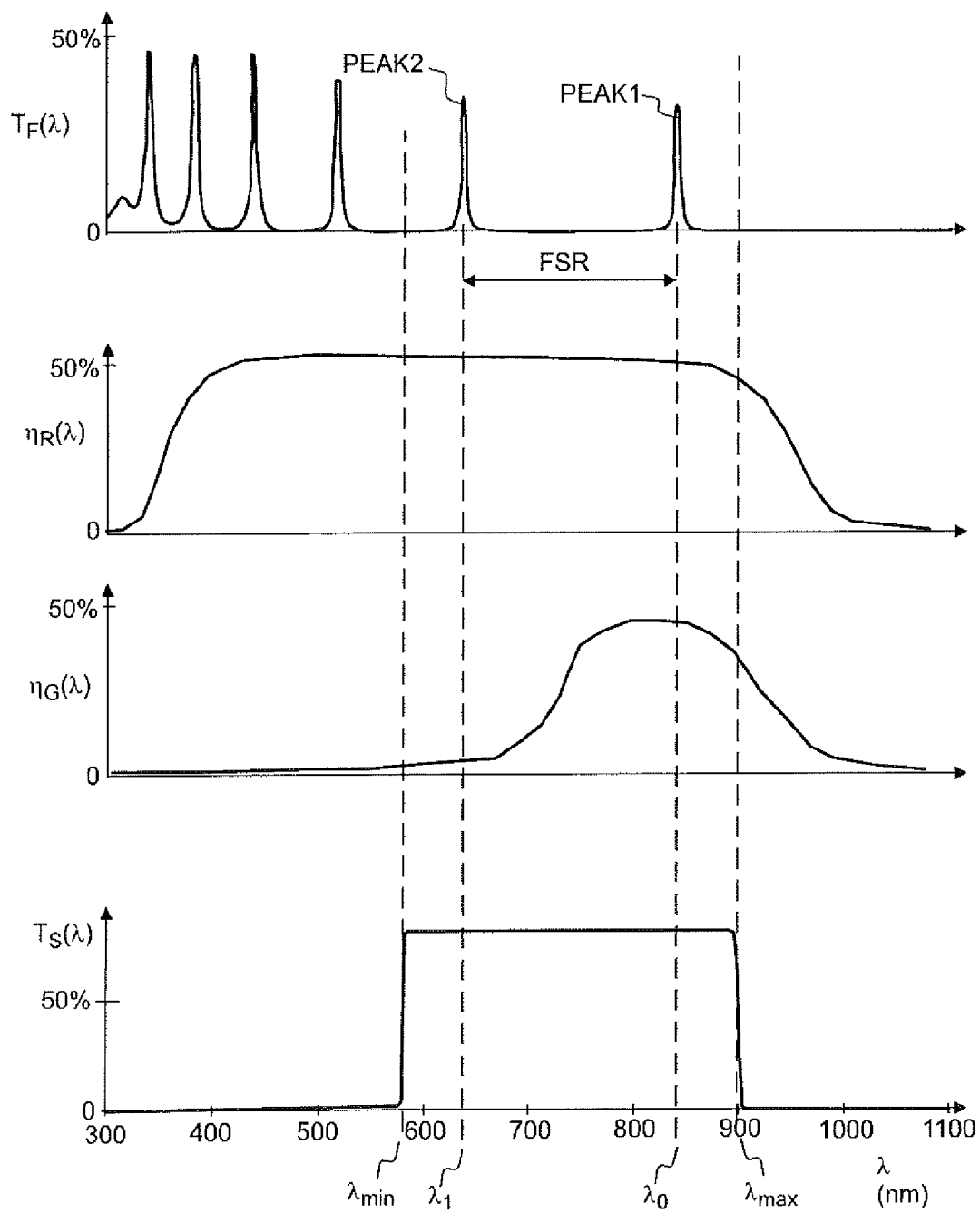
FIG. 5b shows, by way of example, spectral passbands and spectral sensitivity functions of the spectrometer.

Referring to FIG. 5b, the image sensor 200 may comprise first pixels P1 having a sensitivity curve $\eta_R(\lambda)$, and second pixels P2 having a sensitivity curve $\eta_G(\lambda)$. A pixel P1 may provide a detector signal value $S_R$. The pixel P1 may provide a non-zero signal value $S_R$ when the pixel P1 is sensitive to a spectral component of light LB2 impinging on the pixel P1.

The number of different sensitivity curves $\eta_R(\lambda)$, $\eta_G(\lambda)$, $\eta_B(\lambda)$ of the image sensor 200 may be higher than or equal to the number of transmission peaks residing between the cut-off wavelengths $\lambda_{min}$ and $\lambda_{max}$. When the image sensor 200 comprises pixels P1, P2 having two (or more) different sensitivity curves, the cut-off wavelengths $\lambda_{min}$ and $\lambda_{max}$ and the mirror gap d may be selected such that the spectral range defined by the wavelengths $\lambda_{min}$ and $\lambda_{max}$ contains only two transmission peaks PEAK1, PEAK2 of the Fabry-Perot interferometer. The sensitivity curve $\eta_R(\lambda)$ of the first pixels P1 may be so wide that the first pixels P1 are sensitive to spectral components at the first wavelength $\lambda_0$ and also to spectral components at the second wavelength $\lambda_1$. This may provide a wide continuous spectral tuning range for the spectrometer 500 while using an image sensor 200, which has a relatively low number of different sensitivity curves $\eta_R(\lambda)$, $\eta_G(\lambda)$, $\eta_B(\lambda)$. Yet, the first pixels P1 may also be sensitive to spectral components at the third wavelength $\lambda_2$. Yet, the first pixels P1 may be sensitive to all wavelengths between $\lambda_0$ and $\lambda_1$.

The spectrometer 500 may comprise a Fabry-Perot interferometer 100 having an adjustable mirror gap d, and an image sensor 200, wherein the image sensor 200 may comprise a plurality of first pixels P1 and a plurality of second pixels P2 such that the pixels P1, P2 are arranged to detect light LB2 transmitted through the Fabry-Perot interferometer 100. The first pixels P1 may have a first sensitivity function $\eta_R(\lambda)$, the second pixels P2 may have a second different sensitivity function $\eta_G(\lambda)$, the Fabry-Perot interferometer 100 may have a first transmission peak PEAK1 and a second transmission peak PEAK2, and the first pixels P1 may be arranged to detect light at the spectral position $\lambda_0$ of the first transmission peak PEAK1 and also the at the spectral position $\lambda_1$ of the second transmission peak PEAK2.

Figure 6:
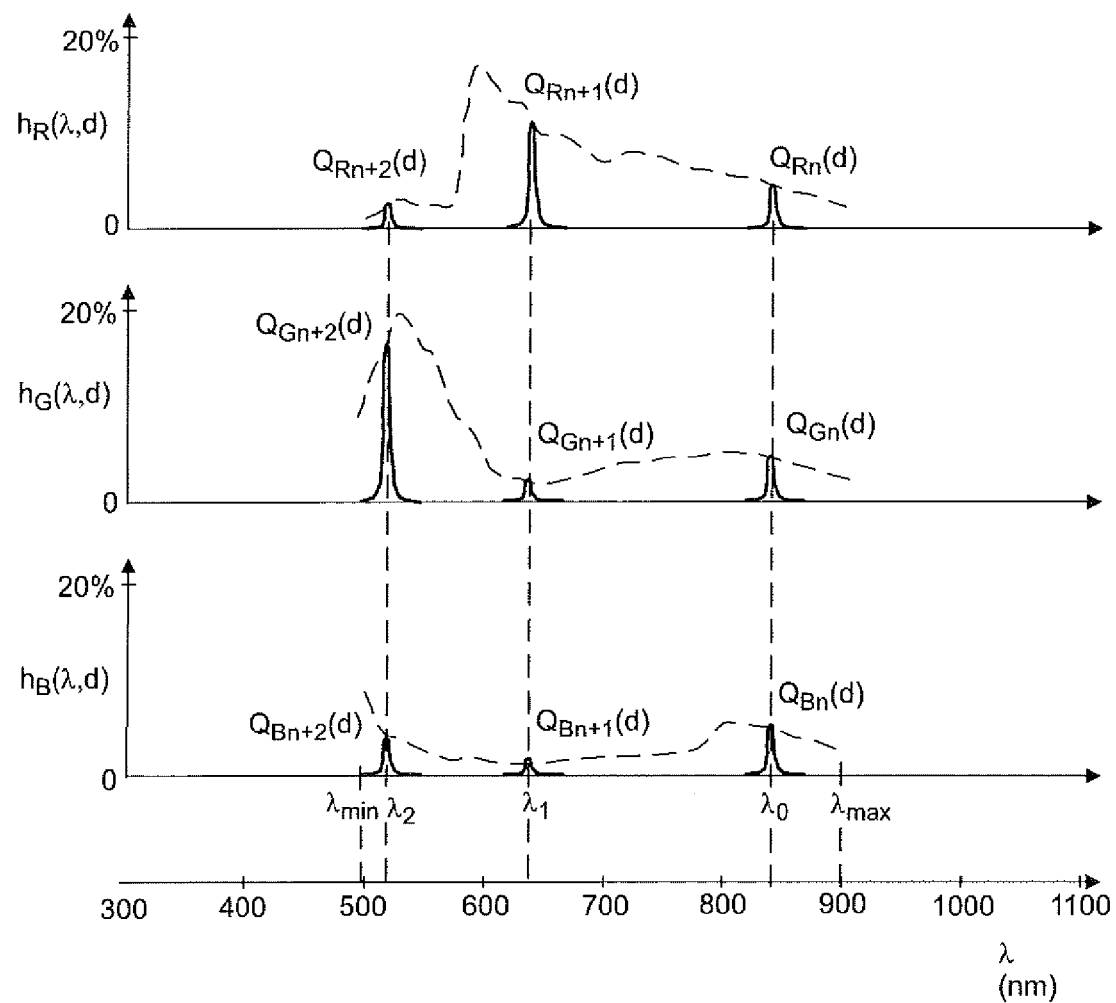
FIG. 6 shows, by way of example, spectral sensitivity functions for the combination of a Fabry-Perot interferometer and an image sensor.

FIG. 6 shows, by way of example, spectral response curves $h_R(\lambda,d)$, $h_G(\lambda,d)$, $h_B(\lambda,d)$ for the spectrometer 500 when light impinging on the pixels P1, P2, P3 has been transmitted through the Fabry-Perot interferometer 100. $h_R(\lambda,d)$ denotes spectral response for the combination of the interferometer 100 and a first pixel P1, $h_G(\lambda,d)$ denotes spectral response for the combination of the interferometer 100 and a second pixel P2, and $h_B(\lambda,d)$ denotes spectral response for the combination of the interferometer 100 and a third pixel P3.

The spectral response function $h_R(\lambda,d)$ may be formed as a product of the functions $T_F(\lambda)$, $\eta_R(\lambda)$ and $T_S(\lambda)$. Examples of the functions $T_F(\lambda)$, $\eta_R(\lambda)$ and $T_S(\lambda)$ were shown e.g. in FIGS. 5a and 5b. The spectral response function $h_R(\lambda,d)$ may be formed as a product of the functions $T_F(\lambda)$, $\eta_R(\lambda)$ and $T_S(\lambda)$. The spectral response function $h_G(\lambda,d)$ may be formed as a product of the functions $T_F(\lambda)$, $\eta_G(\lambda)$ and $T_S(\lambda)$. The spectral response function $h_B(\lambda,d)$ may be formed as a product of the functions $T_F(\lambda)$, $\eta_B(\lambda)$ and $T_S(\lambda)$.

$$h_R(\lambda,d) = \eta_R(\lambda) T_F(\lambda,d) T_S(\lambda) \tag{1a}$$

$$h_G(\lambda,d) = \eta_G(\lambda) T_F(\lambda,d) T_S(\lambda) \tag{1b}$$

$$h_B(\lambda,d) = \eta_B(\lambda) T_F(\lambda,d) T_S(\lambda) \tag{1c}$$

The spectral positions $\lambda_0, \lambda_1, \lambda_2$ of the peaks of the spectral response curves $h_R(\lambda,d)$, $h_G(\lambda,d)$, $h_B(\lambda,d)$ may be changed by changing the value of the mirror gap d.

The value of the integral over each peak of each spectral response function $h_R(\lambda,d)$, $h_G(\lambda,d)$, $h_B(\lambda,d)$ may be calculated by using the following equations $$Q_{Rn}(d) = \int_{\lambda_0(d) - \frac{RNG1}{2}}^{\lambda_0(d) + \frac{RNG1}{2}} \eta_R(\lambda) T_F(\lambda, d) T_S(\lambda) d\lambda \tag{2a}$$

$$Q_{Rn+1}(d) = \int_{\lambda_1(d) - \frac{RNG1}{2}}^{\lambda_1(d) + \frac{RNG1}{2}} \eta_R(\lambda) T_F(\lambda, d) T_S(\lambda) d\lambda \tag{2b}$$

$$Q_{Rn+2}(d) = \int_{\lambda_2(d) - \frac{RNG1}{2}}^{\lambda_2(d) + \frac{RNG1}{2}} \eta_R(\lambda) T_F(\lambda, d) T_S(\lambda) d\lambda \tag{2c}$$

$$Q_{Gn}(d) = \int_{\lambda_0(d) - \frac{RNG1}{2}}^{\lambda_0(d) + \frac{RNG1}{2}} \eta_G(\lambda) T_F(\lambda, d) T_S(\lambda) d\lambda \tag{2d}$$

$$Q_{Gn+1}(d) = \int_{\lambda_1(d) - \frac{RNG1}{2}}^{\lambda_1(d) + \frac{RNG1}{2}} \eta_G(\lambda) T_F(\lambda, d) T_S(\lambda) d\lambda \tag{2e}$$

$$Q_{Gn+2}(d) = \int_{\lambda_2(d) - \frac{RNG1}{2}}^{\lambda_2(d) + \frac{RNG1}{2}} \eta_G(\lambda) T_F(\lambda, d) T_S(\lambda) d\lambda \tag{2f}$$

$$Q_{Bn}(d) = \int_{\lambda_0(d) - \frac{RNG1}{2}}^{\lambda_0(d) + \frac{RNG1}{2}} \eta_B(\lambda) T_F(\lambda, d) T_S(\lambda) d\lambda \tag{2g}$$

$$Q_{Bn+1}(d) = \int_{\lambda_1(d) - \frac{RNG1}{2}}^{\lambda_1(d) + \frac{RNG1}{2}} \eta_B(\lambda) T_F(\lambda, d) T_S(\lambda) d\lambda \tag{2h}$$

$$Q_{Bn+2}(d) = \int_{\lambda_2(d) - \frac{RNG1}{2}}^{\lambda_2(d) + \frac{RNG1}{2}} \eta_B(\lambda) T_F(\lambda, d) T_S(\lambda) d\lambda \tag{2i}$$

RNG1 denotes an integration range. The integration range RNG1 may be e.g. in the range of 2 to 20 times the spectral width $\Delta\lambda_{FWHM}$ of the transmission peak of the function $T_F(\lambda)$. FWHM denotes full width at half maximum. The width of the integration range RNG1 may be limited such that the range RNG1 contains only one transmission peak PEAK1, PEAK2, or PEAK3. The notations $\lambda_0(d)$, $\lambda_1(d)$, $\lambda_2(d)$ indicate that the spectral positions $\lambda_0, \lambda_1, \lambda_2$ are associated with a given mirror gap (d).

The values $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be approximately determined by using narrowband calibration light.

Figure 7A:
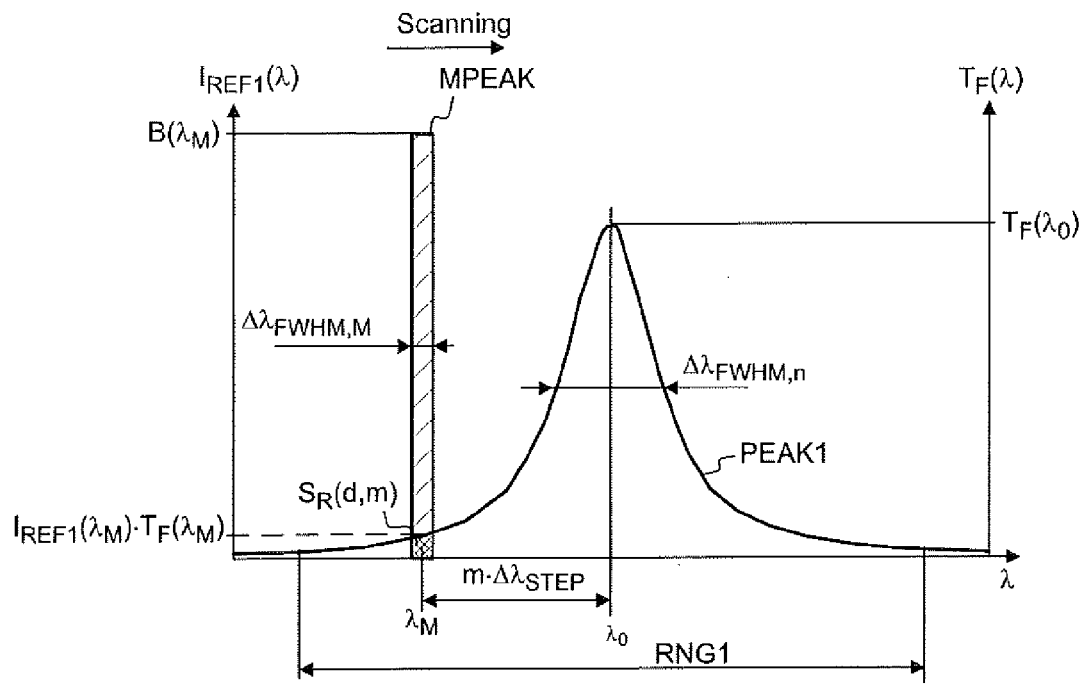
FIG. 7a shows scanning the wavelength of narrowband calibration light with respect to a transmission peak of the interferometer.

FIG. 7a shows the spectral intensity $I_{REF1}(\lambda)$ of a spectral peak MPEAK of the narrowband calibration light and the spectral transmittance $T_F(\lambda)$ of a transmission peak PEAK1 of the interferometer 100. The narrowband calibration light may have (only) one spectral peak MPEAK. The calibration light may be substantially monochromatic. The spectral peak MPEAK may be called e.g. as a calibration peak or as reference peak. The spectral position $\lambda_M$ of the calibration peak MPEAK may be adjustable. The center of the transmission peak PEAK1 may located at the wavelength $\lambda_0$. The spectral peak MPEAK may have a width $\Delta\lambda_{FWHM,M}$. The transmission peak PEAK1 may have a width $\Delta\lambda_{FWHM,n}$. The spectral intensity of light transmitted through the interferometer 100 may be equal to the product $I_{REF1}(\lambda_M) \cdot T_F(\lambda_M)$. A detector signal $S_R$ generated by the calibration light may be proportional to the product $I_{REF1}(\lambda_M) \cdot T_F(\lambda_M) \cdot \Delta\lambda_{FWHM,M}$. The spectral intensity $I_{REF1}(\lambda)$ of the transmission peak PEAK1 may have a known value $B(\lambda_M)$. The value $B(\lambda_M)$ may be determined e.g. by measuring the total intensity of the calibration peak MPEAK e.g. by a photon counter, and by dividing the total intensity by the spectral width $\Delta\lambda_{FWHM,M}$.

Figure 7B:
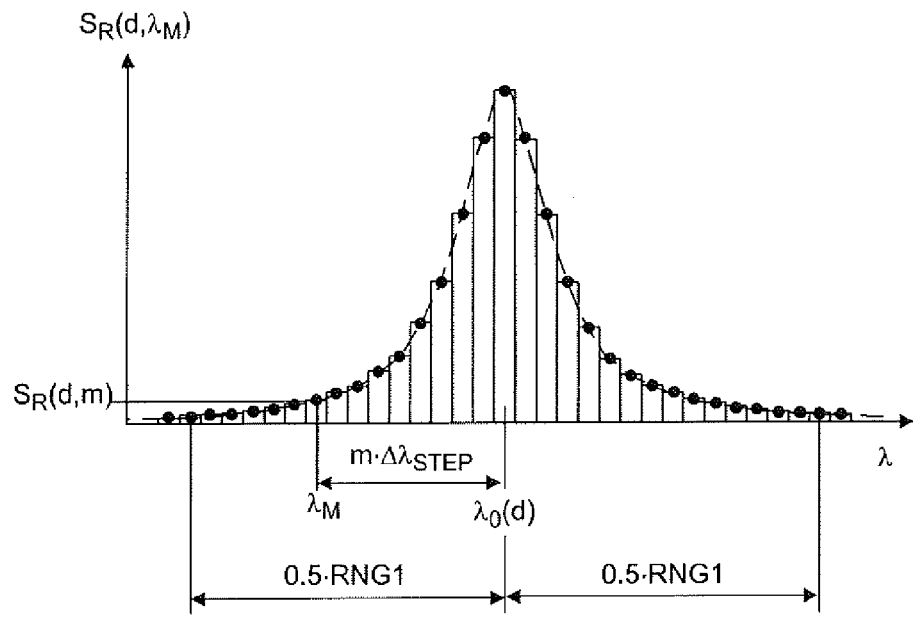
FIG. 7b shows integrating a detector signal over a spectral range.

FIG. 7b shows, by way of example, detector signal values $S_R(d,\lambda_M)$ obtained from a pixel P1 when the mirror gap is set to a value d, and the wavelength $\lambda_M$ of the calibration peak PEAK1 is scanned. $S_R(d,m)$ denotes a detector signal value obtained from the pixel P1 when the $\lambda_M = X + m \cdot \Delta\lambda_{STEP}$. An approximate value of the parameter $Q_{Rn}$ defined in equation (2a) may be determined e.g. by scanning the wavelength $\lambda_M$ of the calibration peak PEAK1 with respect to the wavelength $\lambda_0$ of the transmission peak PEAK1, measuring the detector signal values $S_R$ at each position $\lambda_M$, and calculating the sum of the measured detector signal values $S_R$. In other words, the parameter $Q_{Rn}$ may be determined by numerically integrating detector signal values measured by scanning the wavelength $\lambda_M$ of the calibration peak MPEAK over the transmission peak PEAK1. The sum may be multiplied by a coefficient $W_n$ (see equation 11(a) or 11(b)) so that the value obtained by summation may be used as an estimate for the integral of equation (2a). The scanning step $\Delta\lambda_{STEP}$ and/or the coefficient $W_n$ may be selected such that the numerical integration may provide an estimate for the value of the parameter $Q_{Rn}$. The scanning step $\Delta\lambda_{STEP}$ may be e.g. in the range of 0.5 to 2 times the width $\Delta\lambda_{FWHM,M}$. In particular, the scanning step $\Delta\lambda_{STEP}$ may be substantially equal to the width $\Delta\lambda_{FWHM,M}$. At each spectral position of the calibration peak MPEAK, the difference between the wavelengths $\lambda_0$ and $\lambda_M$ may be e.g. equal to $m \cdot \Delta\lambda_{STEP}$, where m may be an integer. The detector signal values $S_R$ may be obtained from a pixel P1 of from a group of pixels P1. During the scanning, the width $\Delta\lambda_{FWHM,M}$ may be e.g. in the range of 1% to 50% of the width $\Delta\lambda_{FWHM,n}$. For example, the width $\Delta\lambda_{FWHM,n}$ may be substantially equal to 10 nm, the width $\Delta\lambda_{FWHM,M}$ may be substantially equal to 1 nm, and the scanning step $\Delta\lambda_{STEP}$ may be substantially equal to 1 nm.

The values of the other parameters $Q_{Gn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be determined by calibration measurements, respectively.

When using only two transmission peaks PEAK1, PEAK2, only four parameters $Q_{Rn}$, $Q_{Gn}$, $Q_{Rn+1}$, $Q_{Gn+1}$ may need to be determined.

Scanning the wavelength of the spectral peak MPEAK may refer to changing the spectral position $\lambda_M$ of the spectral peak MPEAK such that the spectral peak MPEAK of calibration light LB11 is at a first spectral position $\lambda_{M,t1}$ at a time t1 and at a second different spectral position $\lambda_{M,t2}$ at a time t2. In particular, scanning the wavelength of the spectral peak MPEAK may refer to changing the spectral position $\lambda_M$ of the spectral peak MPEAK such that spectral peak MPEAK is at several spectral positions $\lambda_{M,t1}, \lambda_{M,t2}, \lambda_{M,t3}, \ldots$ at respective times t1, t2, t3, .... The separation between adjacent positions $\lambda_{M,t1}, \lambda_{M,t2}, \lambda_{M,t3}, \ldots$ may be constant ($=\Delta\lambda_{STEP}$) or irregular (i.e. position-dependent). For example, substantially the whole range from $\lambda_{min}$ to $\lambda_{max}$ may be scanned in consecutive order by using a scanning step $\Delta\lambda_{STEP} = 1$ nm.

In an embodiment, the calibration peak MPEAK may be kept at a fixed position, and the approximate value of the parameter $Q_{Rn}$ may be determined by a calibration measurement where the wavelength $\lambda_0$ of the transmission peak is scanned by changing the mirror gap d. Scanning the mirror gap d may refer to changing the mirror gap d such that the mirror gap has a first value $d_{t1}$ at a time t1, and a second value $d_{t2}$ at a time t2. In particular, scanning the mirror gap d may refer to changing the mirror gap d such that the mirror gap has several values $d_{t1}, d_{t2}, d_{t3}$ at respective times t1, t2, t3, ....

Figure 8A:
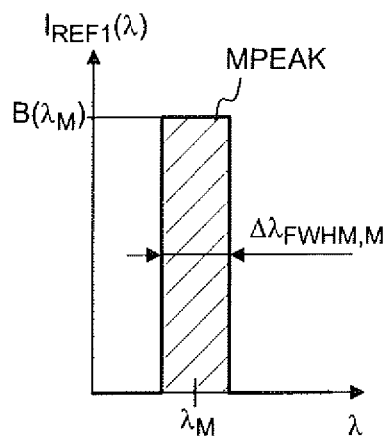
FIG. 8a shows spectral intensity of a calibration peak, which has substantially rectangular profile.
Figure 8B:
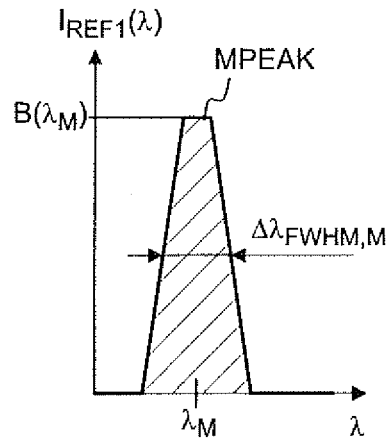
FIG. 8b shows spectral intensity of a calibration peak, which has substantially trapezoid profile.
Figure 8C:
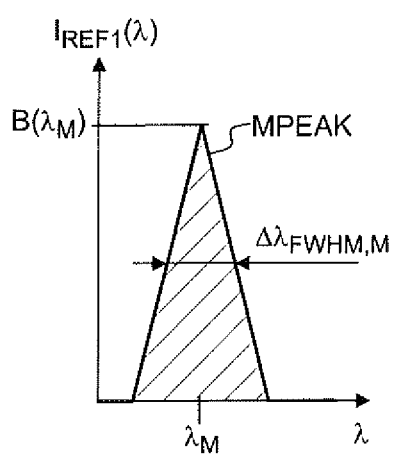
FIG. 8c shows spectral intensity of a calibration peak, which has substantially triangular profile.

FIGS. 8a-8d show various profiles for the calibration peak PEAK1. FIG. 8a shows a rectangular profile. FIG. 8b shows a trapezoid profile. FIG. 8c shows a triangular profile. The profiles of FIGS. 8a-8c may be provided e.g. by filtering broadband light with a monochromator. In case of FIGS. 8a-8c, the maximum spectral intensity $B(\lambda_M)$ may be substantially equal to the total intensity of the calibration peak MPEAK divided by the width $\Delta\lambda_{FWHM,M}$.

Figure 8D:
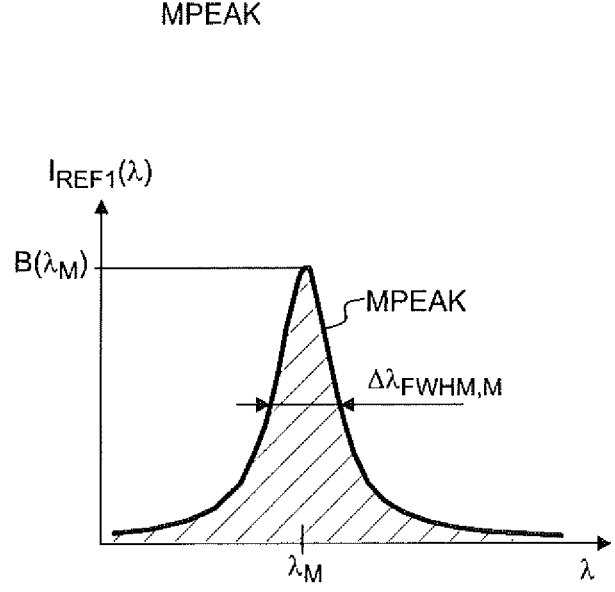
FIG. 8d shows spectral intensity of a calibration peak, which has Lorenz profile.

FIG. 8d shows a calibration peak MPEAK having a Lorentz profile. This type of a profile may be provided e.g. by filtering broadband light with a second Fabry-Perot interferometer. The profile of the calibration peak may be measured and/or determined by simulation, and the maximum spectral intensity $B(\lambda_M)$ may be determined from the total intensity, the width $\Delta\lambda_{FWHM,M}$, and the assumed or measured form of the profile.

Figure 8E:
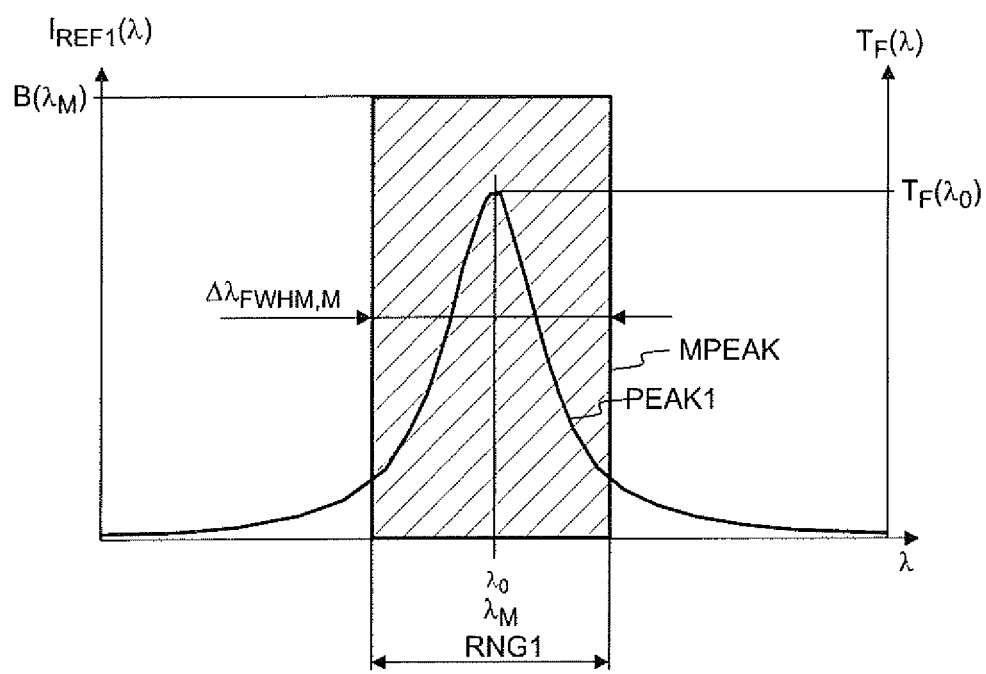
FIG. 8e shows a calibration peak, which is broader than a transmission peak of the interferometer.

Referring to FIG. 8e, a coarse estimate for the value of the parameter $Q_{Rn}$ may also be determined by setting the calibration peak MPEAK substantially to the center of the transmission peak PEAK1, obtaining a detector signal $S_R$ from a pixel P1, and determining the value of the parameter $Q_{Rn}$ from the detector signal $S_R$ and from the width $\Delta\lambda_{FWHM,M}$. In other words, the value of the integral of equation (2a) may be coarsely determined from a single measured detector signal value. The signal value $S_R$ may need to multiplied by a coefficient, which depends on the width $\Delta\lambda_{FWHM,M}$, on the width $\Delta\lambda_{FWHM,n}$, and on the profiles of the peaks PEAK1, MPEAK.

Each detector signal $S_R(d)$, $S_R(d)$, $S_R(d)$ obtained from the image sensor 200 may depend on the spectral positions $\lambda_0, \lambda_1, \lambda_2$ of the transmission peaks PEAK1, PEAK2, PEAK3 of the interferometer 100. The spectral positions $\lambda_0, \lambda_1, \lambda_2$, in turn, depend on the adjustable mirror gap d.

The detector signal value $S_R(d)$ provided by a detector pixel P1 may be formed according to the equation (3a):

$$S_R(d) = \int_{\lambda min}^{\lambda max} \eta_R(\lambda) T_F(\lambda, d) T_S(\lambda) X(\lambda) d\lambda \tag{3a}$$

$X(\lambda)$ denotes spectral intensity. When analyzing light received from an object OBJ1, the spectral intensity may be unknown. However, the spectrometer 500 may be calibrated by using light, which has known spectral intensity. The unit of the detector signal value $S_R(d)$ may be e.g. "volts", "microamperes" (μA) or the "number of signal electrons per unit time".

The detector signal value $S_G(d)$ provided by a detector pixel P2 may be formed according to the equation (3b):

$$S_G(d) = \int_{\lambda min}^{\lambda max} \eta_G(\lambda) T_F(\lambda, d) T_S(\lambda) X(\lambda) d\lambda \quad (3b)$$

The detector signal value $S_B(d)$ provided by a detector pixel P3 may be formed according to the equation (3c):

$$S_B(d) = \int_{\lambda min}^{\lambda max} \eta_B(\lambda) T_F(\lambda, d) T_S(\lambda) X(\lambda) d\lambda \quad (3c)$$

The equations (3a), (3b) and (3c) may be approximated by a matrix equation (4a):

$$\begin{bmatrix} S_R \\ S_G \\ S_B \end{bmatrix} = \begin{bmatrix} Q_{Rn+2} & Q_{Rn+1} & Q_{Rn} \\ Q_{Gn+2} & Q_{Gn+1} & Q_{Gn} \\ Q_{Bn+s} & Q_{Bn+1} & Q_{Bn} \end{bmatrix} \cdot \begin{bmatrix} X_{n+2} \\ X_{n+1} \\ X_n \end{bmatrix} \quad (4a)$$

where the intensity values $X_n = X(\lambda_0)$, $X_{n+1} = X(\lambda_1)$, and $X_{n+2} = X(\lambda_2)$. The wavelengths $\lambda_0$, $\lambda_1$, $\lambda_2$ depend on the mirror gap d. The matrix containing the parameters $Q_{Rn}$, $Q_{Gn}$, $Q_{Rn+1}$, $Q_{Gn+1}$, ... may be called as the matrix Q. In other words, the parameters $Q_{Rn}$, $Q_{Gn}$, $Q_{Rn+1}$, $Q_{Gn+1}$, ... may be used as elements of the matrix Q. The matrix Q may be e.g. a 2×2 matrix, a 3×3 matrix, a 4×4 matrix, or a matrix of higher dimension depending on the number of transmission peaks PEAK1, PEAK2 used the measurement, and depending on the number of different detector pixel types P1, P2 used in the measurement.

For example, when using only two transmission peaks PEAK1, PEAK2, and only two types of detector pixels P1, P2, the equation (4a) may be simplified into the form:

$$\begin{bmatrix} S_R \\ S_G \end{bmatrix} = \begin{bmatrix} Q_{Rn+1} & Q_{Rn} \\ Q_{Gn+1} & Q_{Gn} \end{bmatrix} \cdot \begin{bmatrix} X_{n+1} \\ X_n \end{bmatrix} \quad (4b)$$

Thus, the matrix Q may be determined from a first set of detector signals $S_R$, $S_G$ obtained when the wavelength of the narrowband calibration light substantially matches with the wavelength $\lambda_0$ of the first transmission peak PEAK1, and from a second set of detector signals $S_R$, $S_G$ obtained when the wavelength of the narrowband calibration light substantially matches with the wavelength $\lambda_1$ of the second transmission peak PEAK2.

When using the spectrometer 200 for spectral analysis, the intensity values $X_n$, $X_{n+1}$, and $X_{n+2}$ are unknown parameters of the in-coming light LB1. The detector signal values $S_R$, $S_G$, $S_B$ may be obtained from the image sensor 200, and the approximate values of the matrix elements $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be determined based on calibration measurements. The unknown intensities $X_n$, $X_{n+1}$, and $X_{n+2}$ may be solved from the equation (5):

$$\begin{bmatrix} X_{n+2} \\ X_{n+1} \\ X_n \end{bmatrix} = \begin{bmatrix} Q_{Rn+2} & Q_{Rn+1} & Q_{Rn} \\ Q_{Gn+2} & Q_{Gn+1} & Q_{Gn} \\ Q_{Bn+s} & Q_{Bn+1} & Q_{Bn} \end{bmatrix}^{-1} \cdot \begin{bmatrix} S_R \\ S_G \\ S_B \end{bmatrix} \quad (5)$$

The inverted matrix Q may be replaced with a matrix K:

$$\begin{bmatrix} K_{Rn+2} & K_{Gn+2} & K_{Bn+2} \\ K_{Rn+1} & K_{Gn+1} & K_{Bn+1} \\ K_{Rn} & K_{Gn} & K_{Bn} \end{bmatrix} = \begin{bmatrix} Q_{Rn+2} & Q_{Rn+1} & Q_{Rn} \\ Q_{Gn+2} & Q_{Gn+1} & Q_{Gn} \\ Q_{Bn+2} & Q_{Bn+1} & Q_{Bn} \end{bmatrix}^{-1} \quad (6)$$

The matrix obtained by inverting the matrix Q may be called e.g. as the matrix K. The spectral sensitivities $\eta_R(\lambda)$, $\eta_G(\lambda)$, $\eta_B(\lambda)$ of the detector pixels P1, P2, P3 may be selected such that the matrix Q is invertible. The spectral sensitivities $\eta_R(\lambda)$, $\eta_G(\lambda)$, $\eta_B(\lambda)$ may be selected such that the determinant of the matrix Q deviates from zero. For example, the spectral sensitivities $\eta_R(\lambda)$, $\eta_G(\lambda)$ may be selected such that the ratio $\eta_R(\lambda_1)/\eta_G(\lambda_1)$ is substantially different from the ratio $\eta_R(\lambda_0)/\eta_G(\lambda_0)$.

Auxiliary intensity values $X'_n$, $X'_{n+1}$, and $X'_{n+2}$ of the in-coming light LB1 may now be determined according to the equation (7):

$$\begin{bmatrix} X'_{n+2} \\ X'_{n+1} \\ X'_n \end{bmatrix} = \begin{bmatrix} K_{Rn+2} & K_{Gn+2} & K_{Bn+2} \\ K_{Rn+1} & K_{Gn+1} & K_{Bn+1} \\ K_{Rn} & K_{Gn} & K_{Bn} \end{bmatrix} \cdot \begin{bmatrix} S_R \\ S_G \\ S_B \end{bmatrix} \quad (7)$$

$X'_n$ denotes an estimate for the intensity of the in-coming light LB1 at the wavelength $\lambda_0$. $X'_{n+1}$ denotes an estimate for the intensity of the in-coming light LB1 at the wavelength $\lambda_1$. $X'_{n+2}$ denotes an estimate for the intensity of the in-coming light LB1 at the wavelength $\lambda_2$. The auxiliary values $X'_n$, $X'_{n+1}$, $X'_{n+2}$ may also be called e.g. as intermediate values.

The values of the elements of the matrix Q may be determined approximately e.g. by coupling narrowband calibration light into the spectrometer 500. The auxiliary intensity values $X'_n$, $X'_{n+1}$, $X'_{n+2}$ determined according to the equation (7) may be inaccurate e.g. because the values of the elements of the matrix Q may contain errors. Furthermore, the matrix K is obtained by inverting the matrix Q, and the errors may be amplified in the matrix inversion operation.

Figure 10A:
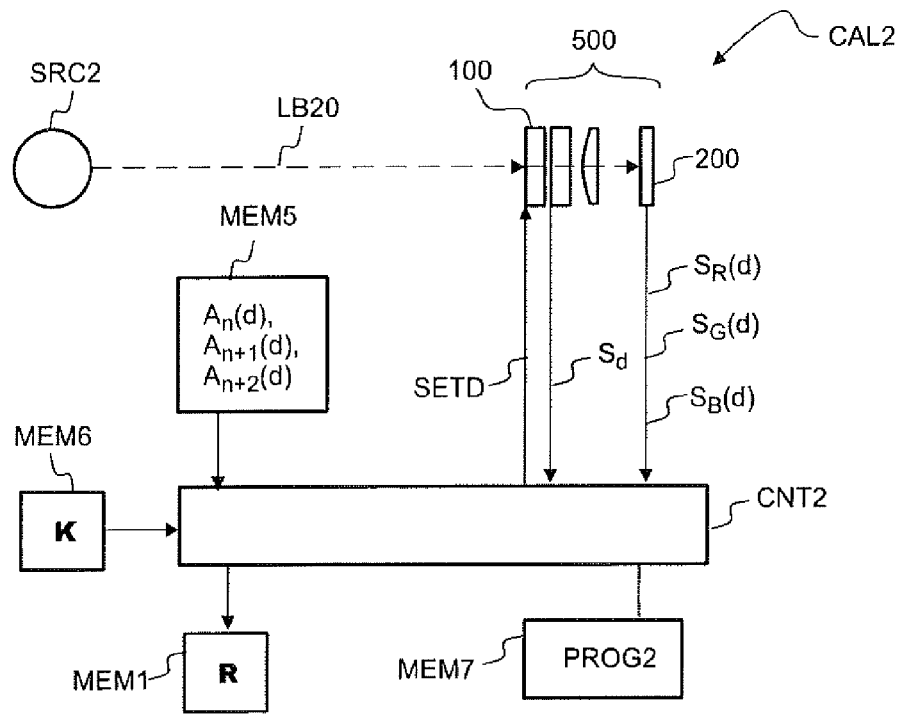
FIG. 10a shows a second system for carrying out a second phase of intensity calibration.

The accuracy of the measured intensity values may be improved by carrying out a second calibration phase, where broadband calibration light LB20 is coupled into the spectrometer (see FIG. 10a). Intensity values $A_n$, $A_{n+1}$, $A_{n+2}$ of the broadband calibration light LB20 may be known at the wavelengths $\lambda_0$, $\lambda_1$, $\lambda_2$ of the peaks PEAK1, PEAK2, PEAK3. $A_n$ denotes the known intensity value of the broadband calibration light LB20 at the wavelength $\lambda_0$, $A_{n+1}$ denotes the known intensity value of the broadband calibration light LB20 at the wavelength $\lambda_1$, and $A_{n+2}$ denotes the known intensity value of the broadband calibration light LB20 at the wavelength $\lambda_2$. The intensity values $A_n$, $A_{n+1}$, $A_{n+2}$ may specify spectral intensity.

A set of detector signals $S_R$, $S_G$, $S_B$ may be obtained from the detector array 200 when the broadband calibration light LB20 is coupled into the spectrometer 500. A set of intermediate values $X'_n$, $X'_{n+1}$, $X'_{n+2}$ may be calculated from the set $S_R$, $S_G$, $S_B$ by using the matrix (K), e.g. according to the equation (7). Correction ratios $(A_n/X'_n)$, $(A_{n+1}/X'_{n+1})$, $(A_{n+2}/X'_{n+2})$ may be formed by dividing the known intensity values $A_n$, $A_{n+1}$, $A_{n+2}$ by the respective intermediate values $X'_n$, $X'_{n+1}$, $X'_{n+2}$. The ratios $(A_n/X'_n)$, $(A_{n+1}/X'_{n+1})$, $(A_{n+2}/X'_{n+2})$ may be used as elements of a correction matrix A as follows:

$$A = \begin{bmatrix} \frac{A_{n+2}}{X'_{n+2}} & \frac{A_{n+2}}{X'_{n+2}} & \frac{A_{n+2}}{X'_{n+2}} \\ \frac{A_{n+1}}{X'_{n+1}} & \frac{A_{n+1}}{X'_{n+1}} & \frac{A_{n+1}}{X'_{n+1}} \\ \frac{A_n}{X'_n} & \frac{A_n}{X'_n} & \frac{A_n}{X'_n} \end{bmatrix} \quad (8)$$

The intensity values $X_n$, $X_{n+1}$, and $X_{n+2}$ of the in-coming light LB1 may now be calculated e.g. by using one of the equations (9a), (9b) or (9c):

$$\begin{bmatrix} X_{n+2} \\ X_{n+1} \\ X_n \end{bmatrix} = \begin{bmatrix} \frac{A_{n+2}}{X'_{n+2}} & \frac{A_{n+2}}{X'_{n+2}} & \frac{A_{n+2}}{X'_{n+2}} \\ \frac{A_{n+1}}{X'_{n+1}} & \frac{A_{n+1}}{X'_{n+1}} & \frac{A_{n+1}}{X'_{n+1}} \\ \frac{A_n}{X'_n} & \frac{A_n}{X'_n} & \frac{A_n}{X'_n} \end{bmatrix} \begin{bmatrix} K_{Rn+2} & K_{Gn+2} & K_{Bn+2} \\ K_{Rn+1} & K_{Gn+1} & K_{Bn+1} \\ K_{Rn} & K_{Gn} & K_{Bn} \end{bmatrix} \cdot \begin{bmatrix} S_R \\ S_G \\ S_B \end{bmatrix} \quad (9a)$$

$$\begin{bmatrix} X_{n+2} \\ X_{n+1} \\ X_n \end{bmatrix} = \begin{bmatrix} \frac{A_{n+2} \cdot K_{Rn+2}}{X'_{n+2}} & \frac{A_{n+2} \cdot K_{Gn+2}}{X'_{n+2}} & \frac{A_{n+2} \cdot K_{Bn+2}}{X'_{n+2}} \\ \frac{A_{n+1} \cdot K_{n+1}}{X'_{n+1}} & \frac{A_{n+1} \cdot K_{n+1}}{X'_{n+1}} & \frac{A_{n+1} \cdot K_{n+1}}{X'_{n+1}} \\ \frac{A_n \cdot K_n}{X'_n} & \frac{A_n \cdot K_n}{X'_n} & \frac{A_n \cdot K_n}{X'_n} \end{bmatrix} \cdot \begin{bmatrix} S_R \\ S_G \\ S_B \end{bmatrix} \quad (9b)$$

$$\begin{bmatrix} X_{n+2} \\ X_{n+1} \\ X_n \end{bmatrix} = \begin{bmatrix} R_{Rn+2} & R_{Gn+2} & R_{Bn+2} \\ R_{Rn+1} & R_{Gn+1} & R_{Bn+1} \\ R_{Rn} & R_{Gn} & R_{Bn} \end{bmatrix} \cdot \begin{bmatrix} S_R \\ S_G \\ S_B \end{bmatrix} \quad (9c)$$

where $$R = A \cdot K \quad (9d)$$

$$R = \begin{bmatrix} R_{Rn+2} & R_{Gn+2} & R_{Bn+2} \\ R_{Rn+1} & R_{Gn+1} & R_{Bn+1} \\ R_{Rn} & R_{Gn} & R_{Bn} \end{bmatrix} \quad (9e)$$

$$K = \begin{bmatrix} K_{Rn+2} & K_{Gn+2} & K_{Bn+2} \\ K_{Rn+1} & K_{Gn+1} & K_{Bn+1} \\ K'_{Rn} & K_{Gn} & K_{Bn} \end{bmatrix} \quad (9f)$$

The image sensor 200 may provide e.g. several image frames per second, and each image frame may comprise signal values from several thousand or even from several millions pixels P1, P2, P3, corresponding to different parts of the optical image IMG1 formed on the image sensor 200. Thus, the spectral intensity values $X_n$, $X_{n+1}$, and $X_{n+2}$ may need to be determined for thousands or millions of different points of the optical image IMG1. Using the matrix equation (9c) may provide a fast way of determining the spectral intensity values $X_n$, $X_{n+1}$, and $X_{n+2}$.

Monitoring the spectrum OSPEC1 of an object OBJ1 may comprise obtaining detector signal values $S_R$, $S_G$, $S_B$ from the image sensor 200 by forming an image IMG1 of the object OBJ1 on the image sensor 200, and calculating intensity values $X_n$, $X_{n+1}$, $X_{n+2}$ from the detector signal values $S_R$, $S_G$, $S_B$ by using calibration parameters stored as elements of the matrix R.

Referring back to FIG. 6, a pixel P1 having the response function $h_R(\lambda)$ may be simultaneously sensitive to light at two or more wavelengths $\lambda_n$, $\lambda_{n+1}$, and $\lambda_{n+2}$. If the pixel P1 provides a non-zero signal $S_R$, the equation (9c) may be used to determine whether or not the light impinging on the pixel P1 contains a spectral component at the wavelength $X_n$, a spectral component at the wavelength $X_{n+1}$, and/or a spectral component at the wavelength $X_{n+2}$. In this sense, the matrix R of equation (9c) may be called e.g. as a resolving matrix or as a decomposing matrix.

The equation (9c) may provide the intensity values $X_n$, $X_{n+1}$, and $X_{n+2}$ at the wavelengths $\lambda_n$, $\lambda_{n+1}$, and $\lambda_{n+2}$. The wavelengths $\lambda_n$, $\lambda_{n+1}$, and $\lambda_{n+2}$, i.e. the spectral positions of the transmission peaks of the Fabry-Perot interferometer 100 depend on the mirror gap d. The values of the elements of the matrix R may be determined for each mirror gap d.

In particular, the intensity value $X_n$ may be calculated by using elements $R_{Rn}$, $R_{Gn}$, $R_{Bn}$ of matrix R according to one of the following equations (10a), (10b), (10c) and/or (10d):

$$X_n(\lambda_0) = R_{Rn}(\lambda_0) \cdot S_R + R_{Gn}(\lambda_1) \cdot S_G + R_{Bn}(\lambda_2) \cdot S_B \quad (10a)$$

$$X_n(d) = R_{Rn}(d) \cdot S_R + R_{Gn}(d) \cdot S_G + R_{Bn}(d) \cdot S_B \quad (10b)$$

$$X_n(C_d) = R_{Rn}(C_d) \cdot S_R + R_{Gn}(C_d) \cdot S_G + R_{Bn}(C_d) \cdot S_B \quad (10c)$$

$$X_n(S_d) = R_{Rn}(S_d) \cdot S_R + R_{Gn}(S_d) \cdot S_G + R_{Bn}(S_d) \cdot S_B \quad (10d)$$

In equation (10a), the element values $R_{Rn}(\lambda_0)$, $R_{Gn}(\lambda_1)$, $R_{Bn}(\lambda_2)$, and the intensity value $X_n(\lambda_0)$ are expressed for a spectral positions $\lambda_0$, wherein the spectral positions $\lambda_1$ and $\lambda_2$ depend on the spectral position $\lambda_0$.

In equation (10b), the element values $R_{Rn}(d)$, $R_{Gn}(d)$, $R_{Bn}(d)$, and the intensity value $X_n(d)$ are expressed for a given mirror gap d.

In equation (10c), the element values $R_{Rn}(C_d)$, $R_{Gn}(C_d)$, $R_{Bn}(C_d)$, and the intensity value $X_n(C_d)$ are expressed for a given capacitance value $C_d$ of the mirror gap capacitor 151, 152.

In equation (10d), the element values $R_{Rn}(S_d)$, $R_{Gn}(S_d)$, $R_{Bn}(S_d)$, and the intensity value $X_n(S_d)$ are expressed for a given feedback signal value $S_d$.

The values of the elements of the matrix R may be stored in the memory MEM1 as calibration parameters CALPAR1, and element values associated with a given mirror gap d may be retrieved from the memory MEM1 when needed. In an embodiment, parameters of a regression function may be stored in the memory MEM1, and element values of the matrix R associated with a given mirror gap d may be calculated by using the regression function.

The decomposing matrix R may have e.g. a dimension 3×3 when three transmission peaks PEAK1, PEAK2, PEAK3 of the interferometer are used and when the image sensor 200 comprises at least three different kinds of detector pixels P1, P2, P3.

The decomposing matrix R may have e.g. a dimension 2×2 when only two transmission peaks PEAK1, PEAK2 of the interferometer are used and when the image sensor 200 comprises at least two different kinds of detector pixels P1, P2. In this case, the intensity values $X_n$, $X_{n+1}$ of in-coming light LB1 may be calculated e.g. by using the equation 10(d):

$$\begin{bmatrix} X_{n+1} \\ X_n \end{bmatrix} = \begin{bmatrix} R_{Rn+1} & R_{Gn+1} \\ R_{Rn} & R_{Gn} \end{bmatrix} \cdot \begin{bmatrix} S_R \\ S_G \end{bmatrix} \quad (10d)$$

The calibration method may comprise measuring a first set of detector signals $S_R$, $S_G$ by using the narrowband calibration light at $\lambda_0$, measuring a second set of detector signals $S_R$, $S_G$ by using the narrowband calibration light at $\lambda_1$, measuring a third set of detector signals $S_R$, $S_G$ by using the broadband calibration light, forming the matrix Q from the first set and the second set, determining the matrix K by inverting the matrix Q, and determining the matrix R from the matrix K by using said third set of detector signals and a set of known intensity values $A_n$, $A_{n+1}$ of the broadband calibration light.

The decomposing matrix may have a dimension 4×4 when four transmission peaks of the interferometer are used and when the image sensor 200 comprises at least four different kinds of detector pixels P1, P2, P3, . . . .

Figure 9A:
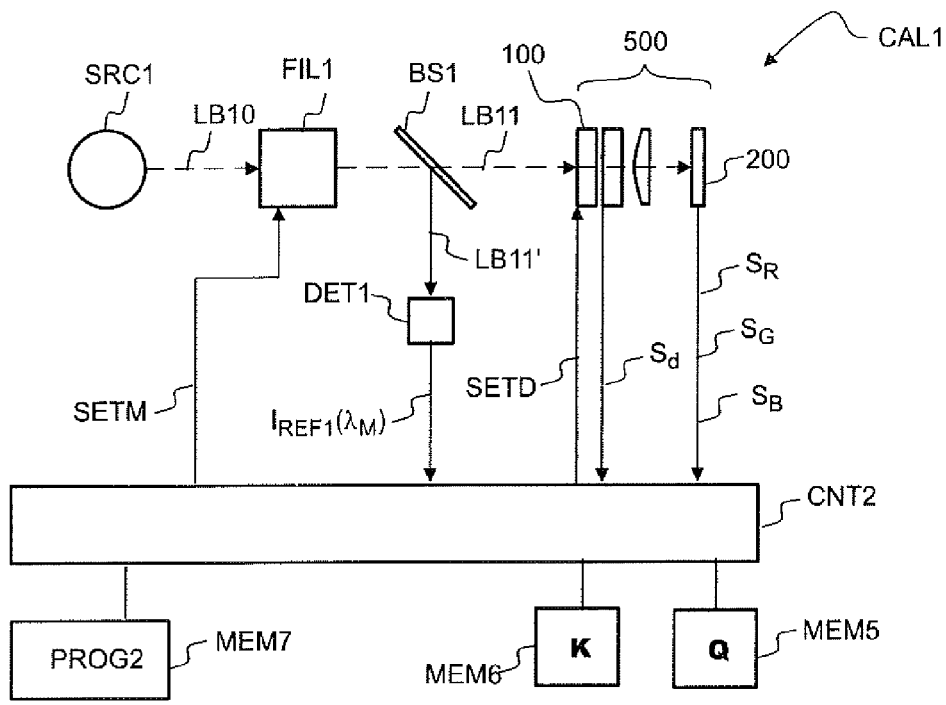
FIG. 9a shows a first system for carrying out a first phase of intensity calibration.
Figure 9B:
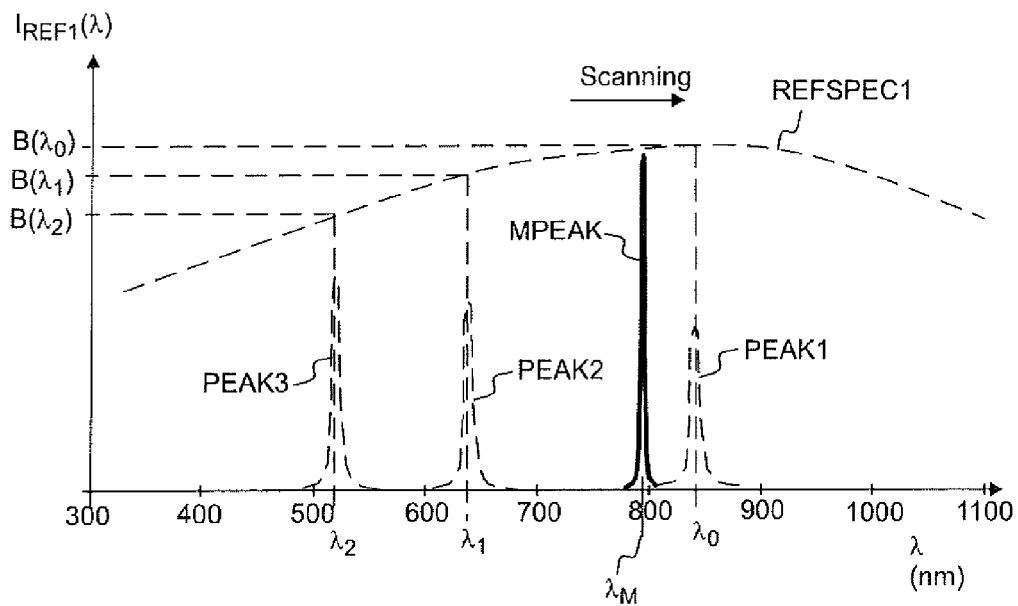
FIG. 9b shows, by way of example, spectral intensity of light for carrying out the first phase of intensity calibration.

FIG. 9a shows a calibration system CAL1 where narrowband light LB11 having an adjustable wavelength $\lambda_M$ is coupled into the spectrometer 500. The narrowband light LB11 may comprise only one spectral peak MPEAK, which has an adjustable central wavelength $\lambda_M$ (FIG. 9b). In particular, the values of the parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be determined by using the narrowband calibration light LB11.

The narrowband calibration light LB11 may be provided e.g. by filtering light LB10 of a broadband light source SRC1 with an adjustable optical narrowband filter FIL1. The broadband light source SRC1 may be e.g. a tungsten halogen lamp, a tungsten ribbon lamp, a blackbody radiator, a light emitting diode, or a gas discharge lamp. The adjustable optical narrowband filter FIL1 may be e.g. a monochromator. An advantage associated with using the monochromator is that the width $\Delta\lambda_{FWHM,M}$ may be known or measured with high accuracy. The adjustable optical narrowband filter FIL1 may also be e.g. a second Fabry-Perot interferometer. The spectral position $\lambda_M$ of the narrowband calibration light LB11 may be set e.g. by sending a control signal SETM to the adjustable optical filter FIL1. A control unit CNT2 may be configured to set and/or change the (central) wavelength $\lambda_M$ of the narrowband calibration light LB11, by sending the control signal SETM to the filter FIL1.

The spectral intensity $I_{REF1}(\lambda_M)$ of the narrowband calibration light LB11 may be monitored e.g. by using a beam splitter BS1 and a reference detector DET1. The beam splitter BS1 may provide an auxiliary beam LB11' for the reference detector DET1.

The control unit CNT2 may be arranged to receive an intensity signal $I_{REF1}(\lambda)$ from the reference detector DET1.

The control unit CNT2 may be configured to receive detector signals $S_R$, $S_G$, $S_B$ from the image sensor 200.

The control unit CNT2 may be configured to set and/or change the mirror gap d of the Fabry-Perot interferometer 500 by sending a control signal SETD. The control unit CNT2 may be arranged to receive a feedback signal $S_d$, which is indicative of the mirror gap d of the Fabry-Perot interferometer 500.

The control unit CNT2 may be configured to determine the values of the elements of the matrix Q from the detector signals $S_R$, $S_G$, $S_B$ associated with the spectral positions $\lambda_0$, $\lambda_1$, $\lambda_2$ of the transmission peaks PEAK1, PEAK2, PEAK3, and from the known intensity values $B(\lambda_0)$, $B(\lambda_1)$, $B(\lambda_2)$ associated with the spectral positions $\lambda_0$, $\lambda_1$, $\lambda_2$.

The calibration system CAL1 may comprise a control unit CNT2 for controlling operation of the system CAL1. The calibration system CAL1 may comprise a memory MEM7 for storing a computer program PROG2. The computer program PROG2 may be configured, when executed by one or more data processors, to carry out the first phase of the calibration of the spectrometer 500.

The calibration system CAL1 may comprise a memory MEM5 for storing values of the elements of the matrix Q. The calibration system CAL1 may comprise a memory MEM6 for storing values of the elements of the matrix K.

The beam splitter BS1 and the reference detector DET1 may also be omitted if the spectral intensity values $I_{REF1}$ associated with each spectral position of the calibration peak MPEAK have been previously measured and stored in a memory.

The narrowband light LB11 may comprise only one spectral peak MPEAK, which has an adjustable central wavelength $\lambda_M$ (FIG. 9b). In particular, the values of the parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be determined from detector signals $S_R$, $S_G$, $S_B$ obtained by scanning the wavelength of the spectral peak MPEAK.

The narrowband calibration light LB11 may be provided also by using another light source instead of the combination of the broadband light source SRC1 and the filter FIL1. For example, calibration light LB11 may be obtained from an optical parametric amplifier (OPA) having an adjustable wavelength.

Referring to FIG. 9b, the first phase of the calibration may comprise:

setting the mirror gap d of the Fabry-Perot interferometer 100 to a desired value, which in turn defines the spectral positions of the spectral peaks PEAK1, PEAK2, adjusting the filter FIL1 such that the calibration peak MPEAK of the calibration light LB11 is set to the spectral position $\lambda_0$ of the first transmission peak PEAK1 of the Fabry-Perot interferometer 100, obtaining detector signal values $S_R(\lambda_0)$, $S_G(\lambda_0)$ from the image sensor, obtaining a reference intensity value $B(\lambda_0)$ from the reference detector DET1, adjusting the filter FIL1 such that the calibration peak MPEAK of the calibration light LB11 is set to the spectral position $\lambda_1$ of the second transmission peak PEAK2, obtaining detector signal values $S_R(\lambda_1)$, $S_G(\lambda_1)$ from the image sensor, obtaining a reference intensity value $B(\lambda_1)$ from the reference detector DET1, and determining the values of the elements of the matrix Q from the measured detector signal values $S_R(\lambda_0)$, $S_G(\lambda_0)$, $S_R(\lambda_1)$, $S_G(\lambda_1)$, $S_B(\lambda_1)$, and the known reference intensity values $B(\lambda_0)$, $B(\lambda_1)$.

The first phase of the calibration may comprise:

setting the mirror gap d of the Fabry-Perot interferometer 100 to a desired value, which in turn defines the spectral positions of the spectral peaks PEAK1, PEAK2, adjusting the filter FIL1 such that the calibration peak MPEAK of the calibration light LB11 is set to the spectral position $\lambda_0$ of the first transmission peak PEAK1 of the Fabry-Perot interferometer 100, obtaining detector signal values $S_R(\lambda_0)$, $S_G(\lambda_0)$, $S_B(\lambda_0)$ from the image sensor, obtaining a reference intensity value $B(\lambda_0)$ from the reference detector DET1, adjusting the filter FIL1 such that the calibration peak MPEAK of the calibration light LB11 is set to the spectral position $\lambda_1$ of the second transmission peak PEAK2, obtaining detector signal values $S_R(\lambda_1)$, $S_G(\lambda_1)$, $S_B(\lambda_1)$ from the image sensor, obtaining a reference intensity value $B(\lambda_1)$ from the reference detector DET1, adjusting the filter FIL1 such that the calibration peak MPEAK of the calibration light LB11 is set to the spectral position $\lambda_2$ of the third transmission peak PEAK3, obtaining detector signal values $S_R(\lambda_2)$, $S_G(\lambda_2)$, $S_B(\lambda_2)$ from the image sensor, obtaining a reference intensity value $B(\lambda_2)$ from the reference detector DET1, and determining the values of the elements of the matrix Q from the measured detector signal values $S_R(\lambda_0)$, $S_G(\lambda_0)$, $S_B(\lambda_0)$, $S_R(\lambda_1)$, $S_G(\lambda_1)$, $S_B(\lambda_1)$, $S_R(\lambda_2)$, $S_G(\lambda_2)$, $S_B(\lambda_2)$ and the known reference intensity values $B(\lambda_0)$, $B(\lambda_1)$, $B(\lambda_2)$. The elements of the matrix Q may be determined e.g. by using the equations (11a)-(11j).

More accurate estimates for the parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be determined by scanning and numerical integration. For example, the first phase of the calibration may comprise:

setting the mirror gap d of the Fabry-Perot interferometer 100 to a desired value, which in turn defines the spectral positions of the spectral peaks PEAK1, PEAK2, PEAK3, obtaining a first set of detector signal values $(S_R(\lambda_0)$, $S_G(\lambda_0)$, $S_B(\lambda_0))$ by scanning the wavelength $(\lambda_M)$ of the calibration peak MPEAK over the spectral position $\lambda_0$ of the first transmission peak PEAK1, obtaining a reference intensity value $B(\lambda_0)$ from the reference detector DET1, obtaining a second set of detector signal values $(S_R(\lambda_1)$, $S_G(\lambda_1)$, $S_B(\lambda_1))$ by scanning the wavelength $(\lambda_M)$ of the calibration peak MPEAK over the spectral position $\lambda_1$ of the second transmission peak PEAK2, obtaining a reference intensity value $B(\lambda_1)$ from the reference detector DET1, obtaining a third set of detector signal values $(S_R(\lambda_2)$, $S_G(\lambda_2)$, $S_B(\lambda_2))$ by scanning the wavelength $(\lambda_M)$ of the calibration peak MPEAK over the spectral position $\lambda_2$ of the third transmission peak PEAK3, obtaining a reference intensity value $B(\lambda_2)$ from the reference detector DET1, and determining the parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ from the first set of detector signal values, from the second set of detector signal values, from the third set of detector signal values and from the reference intensity values $B(\lambda_0)$, $B(\lambda_1)$, $B(\lambda_2)$.

The spectral width $\Delta\lambda_{FWHM,M}$ of the (single) spectral peak MPEAK of the calibration light LB11 may be substantially smaller than the free spectral range FSR of the Fabry-Perot interferometer 100. Thus, the spectral intensity of the calibration light LB11 at the other wavelengths $\lambda_1$ and $\lambda_2$ may be substantially equal to zero when the calibration peak MPEAK is set to the spectral position $\lambda_0$. In particular, the spectral width $\Delta\lambda_{FWHM,M}$ may be narrower than the width $\Delta\lambda_{FWHM,n}$ of the transmission peak PEAK1.

The parameter $Q_{Rn}$ may be approximately determined by summing a plurality of detector signal values $S_R(\lambda_0,\lambda_M)$ obtained by scanning the wavelength $\lambda_M$ over a scanning range RNG1, which contains the wavelength $\lambda_0$, and by dividing the sum by the known intensity value $B(\lambda_0)$:

$$Q_{Rn} = \frac{W_n}{B(\lambda_0)} \cdot \sum S_R(\lambda_0, \lambda_M) \quad (11a)$$

where $\lambda_0$ is the spectral position of the transmission peak PEAK1, $S_R(\lambda_0,\lambda_M)$ is a detector signal obtained from the first pixel P1 when the narrowband calibration light LB11 is at the spectral position $\lambda_M$. $W_n$ may be a constant.

In particular, the parameter $Q_{Rn}$ may be determined by calculating the sum:

$$Q_{Rn} = \frac{W_n}{B(\lambda_0)} \cdot \sum_{m=m_{MIN}}^{m_{MAX}} S_R(\lambda_0, \lambda_M(m)) \quad (11b)$$

where $S_R(\lambda_0,\lambda_M(m))$ is a detector signal obtained from the first pixel P1 when the narrowband calibration light LB11 is at the spectral position $\lambda_M(m)$, m represents the index of summation, $\lambda_M(m)$ is the spectral position of narrowband calibration light LB11 associated with each index m, $m_{MIN}$ is the lower bound of summation, and $m_{MAX}$ is the upper bound of summation. The lower bound $m_{MIN}$ may be e.g. substantially equal to $-0.5 \cdot RNG1/\Delta\lambda_{STEP}$, and the upper bound $m_{MAX}$ may be e.g. substantially equal to $0.5 \cdot RNG1/\Delta\lambda_{STEP}$. The scanning step may be equal to $\Delta\lambda_{STEP}$. The scanning step $\Delta\lambda_{STEP}$ may be constant, and the spectral position $\lambda_M(m)$ may be given e.g. by the equation $\lambda_M(m) = \lambda_0 + m \cdot \Delta\lambda_{STEP}$. However, the scanning step may also be variable, i.e. the value of the scanning step $\Delta\lambda_{STEP}$ may also depend on the index m.

Thus, the parameter $Q_{Rn}$ may be determined by a method, which comprises obtaining a set of detector signal values $S_R$ from the image sensor 200 by scanning the wavelength $\lambda_M$ of the reference spectral peak MPEAK over a spectral range RNG1, which comprises the first spectral position $\lambda_0$, and calculating the sum of said set of detector signal values $S_R$.

Alternatively, the parameter $Q_{Rn}$ may be determined by a method, which comprises obtaining a set of detector signal values $S_R$ from the image sensor 200 by scanning the wavelength $\lambda_0$ of the first transmission peak PEAK1 over a spectral range RNG1, which comprises the spectral position $\lambda_M$ of the reference spectral peak MPEAK, and calculating the sum of said set of detector signal values $S_R$. The wavelength $\lambda_0$ of the first transmission peak PEAK may be scanned by changing the mirror gap d.

The parameter $Q_{Gn}$ may be determined by summing a plurality of detector signal values $S_G(\lambda_0,\lambda_M)$ obtained by scanning the wavelength $\lambda_M$ over a scanning range containing the wavelength $\lambda_0$, and by dividing the sum by the known intensity value $B(\lambda_0)$:

$$Q_{Gn} = \frac{W_n}{B(\lambda_0)} \cdot \sum S_G(\lambda_0, \lambda_M) \quad (11c)$$

where $S_G(\lambda_0,\lambda_M)$ is a detector signal obtained from the second pixel P2 when the narrowband calibration light LB11 is at the spectral position $\lambda_M$.

The parameter $Q_{Bn}$ may be determined by summing a plurality of detector signal values $S_B(\lambda_0,\lambda_M)$ obtained by scanning the wavelength $\lambda_M$ over a scanning range containing the wavelength $\lambda_0$, and by dividing the sum by the known intensity value $B(\lambda_0)$:

$$Q_{Bn} = \frac{W_n}{B(\lambda_0)} \cdot \sum S_B(\lambda_0, \lambda_M) \quad (11d)$$

where $S_B(\lambda_0,\lambda_M)$ is a detector signal obtained from the third pixel P3 when the narrowband calibration light LB11 is at the spectral position $\lambda_M$.

The parameter $Q_{Rn}+1$ may be determined by summing a plurality of detector signal values $S_R(\lambda_1,\lambda_M)$ obtained by scanning the wavelength $\lambda_M$ over a scanning range containing the wavelength $\lambda_1$, and by dividing the sum by the known intensity value $B(\lambda_1)$:

$$Q_{Rn+1} = \frac{W_{n+1}}{B(\lambda_1)} \cdot \sum S_R(\lambda_1, \lambda_M) \quad (11e)$$

where $\lambda_1$ is the spectral position of the transmission peak PEAK2, $S_R(\lambda_1,\lambda_M)$ is a detector signal obtained from the first pixel P1 when the narrowband calibration light LB11 is at the spectral position $\lambda_M$, and $W_{n+1}$ may be a constant.

The parameter $Q_{Gn+1}$ may be determined by summing a plurality of detector signal values $S_G(\lambda_1,\lambda_M)$ obtained by scanning the wavelength $\lambda_M$ over a scanning range containing the wavelength $\lambda_1$, and by dividing the sum by the known intensity value $B(\lambda_1)$:

$$Q_{Gn+1} = \frac{W_{n+1}}{B(\lambda_1)} \cdot \sum S_G(\lambda_1, \lambda_M) \quad (11f)$$

where $S_G(\lambda_1,\lambda_M)$ is a detector signal obtained from the second pixel P2 when the narrowband calibration light LB11 is at the spectral position $\lambda_M$.

The parameter $Q_{Bn+1}$ may be determined by summing a plurality of detector signal values $S_B(\lambda_1,\lambda_M)$ obtained by scanning the wavelength $\lambda_M$ over a scanning range containing the wavelength $\lambda_1$, and by dividing the sum by the known intensity value $B(\lambda_1)$:

$$Q_{Bn+1} = \frac{W_{n+1}}{B(\lambda_1)} \cdot \sum S_B(\lambda_1, \lambda_M) \quad (11g)$$

where $S_B(\lambda_1,\lambda_M)$ is a detector signal obtained from the third pixel P3 when the narrowband calibration light LB11 is at the spectral position $\lambda_M$.

The parameter $Q_{Rn+2}$ may be determined by summing a plurality of detector signal values $S_R(\lambda_2,\lambda_M)$ obtained by scanning the wavelength $\lambda_M$ over a scanning range containing the wavelength $\lambda_2$, and by dividing the sum by the known intensity value $B(\lambda_2)$:

$$Q_{Rn+2} = \frac{W_{n+2}}{B(\lambda_2)} \cdot \sum S_R(\lambda_2, \lambda_M) \quad (11h)$$

where $\lambda_2$ is the spectral position of the transmission peak PEAK3, $S_R(\lambda_1,\lambda_M)$ is a detector signal obtained from the first pixel P1 when the narrowband calibration light LB11 is at the spectral position $\lambda_M$. $W_{n+2}$ may be a constant.

The parameter $Q_{Gn+2}$ may be determined by summing a plurality of detector signal values $S_G(\lambda_2,\lambda_M)$ obtained by scanning the wavelength $\lambda_M$ over a scanning range containing the wavelength $\lambda_2$, and by dividing the sum by the known intensity value $B(\lambda_2)$:

$$Q_{Gn+2} = \frac{W_{n+2}}{B(\lambda_2)} \cdot \sum S_G(\lambda_2, \lambda_M) \quad (11i)$$

where $S_G(\lambda_1,\lambda_M)$ is a detector signal obtained from the second pixel P2 when the narrowband calibration light LB11 is at the spectral position $\lambda_M$.

The parameter $Q_{Bn+2}$ may be determined by summing a plurality of detector signal values $S_B(\lambda_2,\lambda_M)$ obtained by scanning the wavelength $\lambda_M$ over a scanning range containing the wavelength $\lambda_2$, and by dividing the sum by the known intensity value $B(\lambda_2)$:

$$Q_{Bn+2} = \frac{W_{n+2}}{B(\lambda_2)} \cdot \sum S_B(\lambda_2, \lambda_M) \quad (11j)$$

where $S_B(\lambda_1,\lambda_M)$ is a detector signal obtained from the third pixel P3 when the narrowband calibration light LB11 is at the spectral position $\lambda_M$.

The values of the coefficients $W_n$, $W_{n+1}$, $W_{n+2}$ may be determined from the spectral widths $\Delta\lambda_{FWHM,n}$, $\Delta\lambda_{FWHM,n+1}$, $\Delta\lambda_{FWHM,n+2}$ of the transmission peaks PEAK1, PEAK2, PEAK3, from the spectral width $\Delta\lambda_{FWHM,M}$ of the narrowband calibration peak MPEAK, from the scanning step $\Delta\lambda_{STEP}$, from the profiles of the transmission peaks PEAK1, PEAK2, PEAK3, and from the profile of the narrowband calibration peak MPEAK. In particular, the value of the coefficient $W_n$ may be substantially equal to one when the profile of the calibration peak MPEAK is substantially rectangular (FIG. 8a), substantially trapezoidal (FIG. 8b) or substantially triangular (FIG. 8c), when the spectral width $\Delta\lambda_{FWHM,M}$ is narrower than 50% of the spectral width $\Delta\lambda_{FWHM,n}$, and when the scanning step $\Delta\lambda_{STEP}$ is substantially equal to the spectral width $\Delta\lambda_{FWHM,M}$. For example, the values of the coefficients $W_n$, $W_{n+1}$, $W_{n+2}$ may be substantially equal to one when the spectral widths $\Delta\lambda_{FWHM,n}$, $\Delta\lambda_{FWHM,n+1}$, $\Delta\lambda_{FWHM,n+2}$ are substantially equal to 10 nm, the spectral width $\Delta\lambda_{FWHM,M}$ is substantially equal to 1 nm, the scanning step $\Delta\lambda_{STEP}$ is substantially equal to the spectral width $\Delta\lambda_{FWHM,M}$, and the calibration peak MPEAK is produced by the monochromator FIL1. If the spectral width $\Delta\lambda_{FWHM,M}$ is equal to two times the scanning step $\Delta\lambda_{STEP}$, the coefficients $W_n$, $W_{n+1}$, $W_{n+2}$ may be e.g. substantially equal to 0.5.

Less accurate estimates for the parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be determined from equations (12a) to (12i) by setting the calibration peak MPEAK to the wavelength $\lambda_0$, to the wavelength $\lambda_1$, and to the wavelength $\lambda_2$, and obtaining the maximum detector signal values $S_R(\lambda_0)$, $S_G(\lambda_0)$, $S_G(\lambda_0)$, $S_R(\lambda_1)$, $S_G(\lambda_1)$, $S_B(\lambda_1)$, $S_R(\lambda_2)$, $S_G(\lambda_2)$, $S_B(\lambda_2)$.

$$Q_{Rn} = W_n \cdot S_R(\lambda_0)/B(\lambda_0) \quad (12a)$$

$$Q_{Gn} = W_n \cdot S_G(\lambda_0)/B(\lambda_0) \quad (12b)$$

$$Q_{Bn} = W_n \cdot S_B(\lambda_0)/B(\lambda_0) \quad (12c)$$

$$Q_{Rn+1} = W_{n+1} \cdot S_R(\lambda_1)/B(\lambda_1) \quad (12d)$$

$$Q_{Gn+1} = W_{n+1} \cdot S_G(\lambda_1)/B(\lambda_1) \quad (12e)$$

$$Q_{Bn+1} = W_{n+1} \cdot S_B(\lambda_1)/B(\lambda_1) \quad (12f)$$

$$Q_{Rn+2} = W_{n+2} \cdot S_R(\lambda_2)/B(\lambda_2) \quad (12g)$$

$$Q_{Bn+2} = W_{n+2} \cdot S_B(\lambda_2)/B(\lambda_2) \quad (12i)$$

The values of the coefficients $W_n$, $W_{n+1}$, $W_{n+2}$ may be calculated from the spectral widths $\Delta\lambda_{FWHM,n}$, $\Delta\lambda_{FWHM,n+1}$, $\Delta\lambda_{FWHM,n+2}$ of the transmission peaks PEAK1, PEAK2, PEAK3, from the spectral width $\Delta\lambda_{FWHM,M}$ of the narrowband calibration peak MPEAK, from the profiles of the transmission peaks PEAK1, PEAK2, PEAK3, and from the profile of the narrowband calibration peak MPEAK.

The parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ obtained by using equations (11a) to (11i) or (12a) to (12i) may constitute the elements of the matrix Q. The matrix Q may be temporarily stored in a memory MEM5. The matrix K may be determined by inverting the matrix Q. The matrix K may be stored in a memory MEM6.

FIG. 10a shows a calibration system CAL2 where broadband light LB20 having a known spectral intensity distribution REFSPEC2 is coupled into the spectrometer 500. The broadband light LB20 may be provided by a light source SRC2, which may be e.g. a tungsten halogen lamp, a tungsten ribbon lamp, or a blackbody radiator. Light provided by the light source SRC2 may be coupled to the spectrometer 500 substantially without modifying the original spectral intensity distribution of the light source SRC2, or by modifying the spectral intensity distribution e.g. by filtering the light from the light source SRC2 with a color glass filter.

Figure 10B:
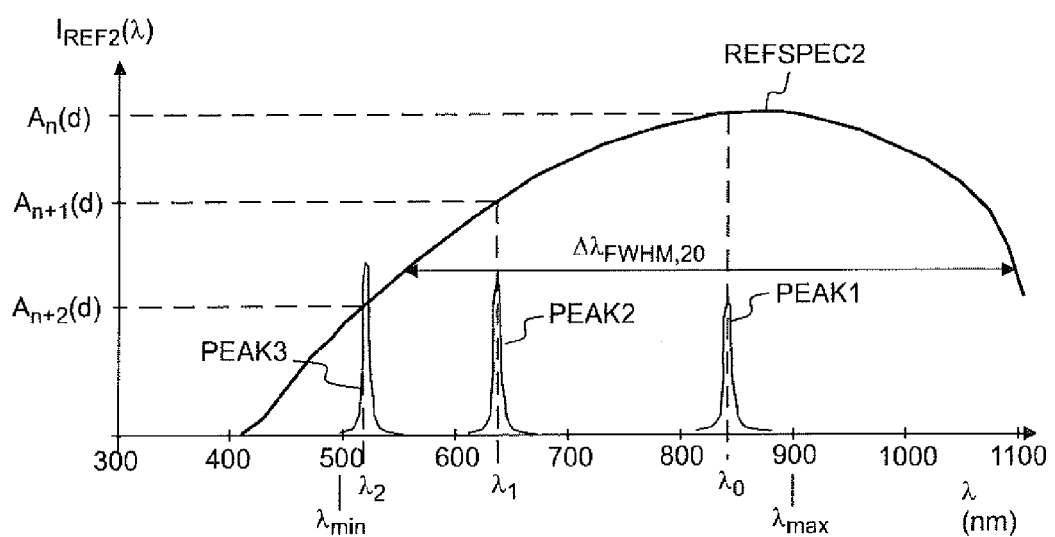
FIG. 10b shows, by way of example, spectral intensity of light for carrying out the second phase of intensity calibration.

FIG. 10b shows, by way of example, a spectral intensity REFSPEC2 of broadband light LB20 coupled into the spectrometer 500. The spectral intensity REFSPEC2 may have known values $A_n(d), A_{n+1}(d), A_{n+2}(d)$ at the spectral positions $\lambda_0, \lambda_1, \lambda_2$, which correspond to the mirror gap d. The mirror gap d may be adjusted and/or scanned to change the spectral positions $\lambda_0, \lambda_1, \lambda_2$ of the transmission peaks PEAK1, PEAK2, PEAK3. The system CAL2 may comprise a control unit CNT2 for sending a control signal SETD to the interferometer 100. The spectrometer 500 may provide a feedback signal $S_d$ indicative of the actual mirror gap d. $I_{REF2}(\lambda)$ denotes spectral intensity at a wavelength $\lambda$.

For each gap d, the image sensor 200 may provide a set of detector signal values $S_R(d), S_G(d), S_B(d)$. Each mirror gap d corresponds to certain spectral positions $\lambda_0, \lambda_1, \lambda_2$ of the transmission peaks PEAK1, PEAK2, PEAK3. The mirror gap d may be selected such that it provides the same spectral positions $\lambda_0, \lambda_1, \lambda_2$ of the transmission peaks PEAK1, PEAK2, PEAK3, which were used for determining the elements $Q_{Rn}, Q_{Gn}, Q_{Bn}, Q_{Rn+1}, Q_{Gn+1}, Q_{Bn+1}, Q_{Rn+2}, Q_{Gn+2}, Q_{Bn+2}$ of the matrix Q. The matrix K may be obtained by inverting the matrix Q.

Auxiliary intensity values $X'_n, X'_{n+1}, X'_{n+2}$ relevant for the calibration situation CAL2 may now be calculated from the equation (7) by using the measured detector signals $S_R(d), S_G(d), S_B(d)$ and by using the matrix K obtained by inverting the matrix Q. The auxiliary intensity values $X'_n, X'_{n+1}, X'_{n+2}$ may calculated and temporarily stored in a memory. The approximate intensity values $X'_n, X'_{n+1}, X'_{n+2}$ may deviate from the true intensity values $A_n, A_{n+1},$ and $A_{n+2}$. The correction matrix A may now be determined from the calculated auxiliary intensity values $X'_n, X'_{n+1}, X'_{n+2}$ and from the true (known) intensity values $A_n, A_{n+1},$ and $A_{n+2}$, by using equation (8). The decomposing matrix R may now be determined from the approximate intensity values $X'_n, X'_{n+1}, X'_{n+2}$, from the true intensity values $A_n, A_{n+1},$ and $A_{n+2}$, and from the matrix K by using the equations (8) and (9d).

The intensity distribution REFSPEC2 may have a spectral width $\Delta\lambda_{FWHM,20}$ (where FWHM means full width at half maximum). The spectral width $\Delta\lambda_{FWHM,20}$ may also be called as the bandwidth. The bandwidth $\Delta\lambda_{FWHM,20}$ of the second calibration light LB20 may be broader than the spectral width $\Delta\lambda_{FWHM,M}$ of the reference spectral peak MPEAK. The bandwidth $\Delta\lambda_{FWHM,20}$ of the second calibration light LB20 may be broader than the spectral width $\Delta\lambda_{FWHM,n}$ of the first transmission peak PEAK1. In an embodiment, the bandwidth $\Delta\lambda_{FWHM,20}$ may be so large, that it includes the whole range between the cut-off wavelengths $\lambda_{min}$ and $\lambda_{max}$. The calibration light LB20 may be provided e.g. by a blackbody radiator, by a tungsten ribbon lamp, by a tungsten halogen lamp or by a light emitting diode, and the bandwidth $\Delta\lambda_{FWHM,20}$ may be e.g. several hundreds of nanometers.

Figure 10C:
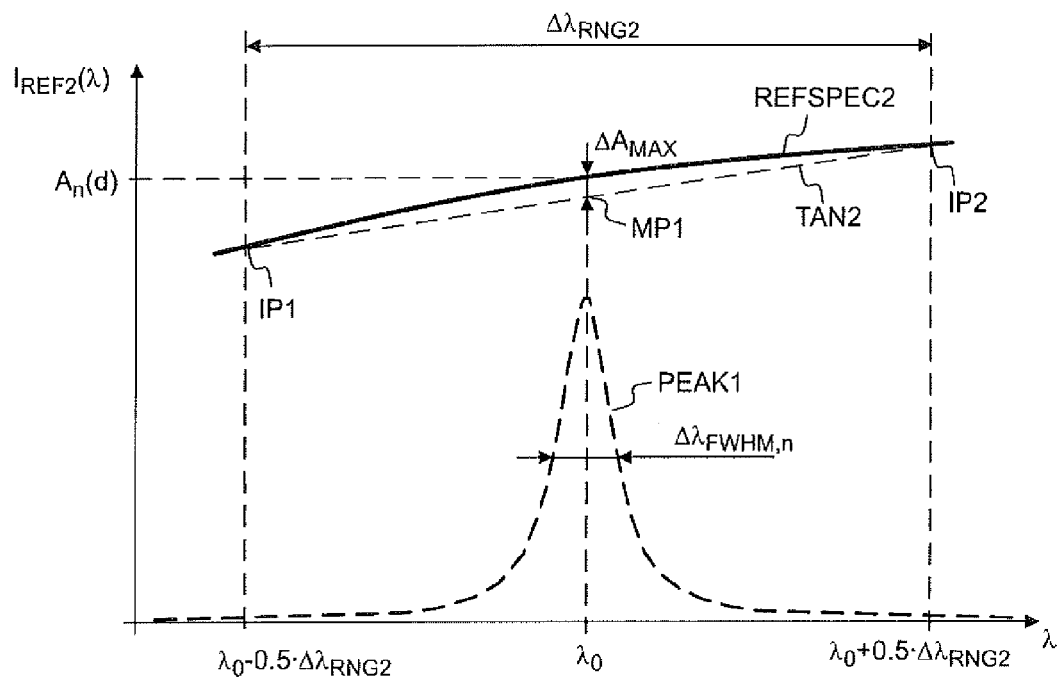
FIG. 10c shows, by way of example, a portion of a spectral intensity curve, which exhibits substantially linear variation in the vicinity of a transmission peak.

Referring to FIG. 10c, the spectrum of the broadband light LB20 may be selected e.g. such that the spectrum REFSPEC2 exhibits substantially linear variation in the vicinity of the spectral positions $\lambda_0, \lambda_1,$ and/or $\lambda_2$. This may provide sufficient calibration accuracy when the transmission peaks PEAK1, PEAK2, PEAK3 are at least approximately symmetrical. For example, a first wavelength $\lambda_0 - 0.5 \cdot \Delta\lambda_{RNG2}$ and a second wavelength $\lambda_0 + 0.5 \cdot \Delta\lambda_{RNG2}$ may be selected such that the difference $\Delta\lambda_{RNG2}$ between said wavelengths is substantially equal to five times the width $\Delta\lambda_{FWHM,n}$ of the spectral peak PEAK1. A line TAN 2 may intersect the curve REFSPEC2 at the intersection points IP1, IP2. The portion of the spectrum REFSPEC2 defined by the spectral range $\Delta\lambda_{RNG2}$ may deviate e.g. less than 1% from linearity, which means that the distance $\Delta A_{MAX}$ between the value $A_n(d)$ and the middle point MP1 of the line TAN 2 connecting the intersection points IP1, IP2 is smaller than 1% of the value $A_n(d)$. In an embodiment, a first portion of the spectrum REFSPEC2 may be substantially linear in the vicinity of the spectral position $\lambda_0$, a second portion of the spectrum REFSPEC2 may be substantially linear in the vicinity of the spectral position $\lambda_1$, and a third portion of the spectrum REFSPEC2 may be substantially linear in the vicinity of the spectral position $\lambda_2$. The spectrum REFSPEC2 may deviate less than 1% from linearity in a first spectral range, which comprises the spectral position $\lambda_0$, and less than 1% in a second spectral range, which comprises the spectral position $\lambda_1$. If three transmission peaks are used, the deviation from linearity may also be less than 1% in a third spectral range, which comprises the spectral position $\lambda_2$. Each spectral range may be equal to five times the width $\Delta\lambda_{FWHM,n}$ of the spectral peak PEAK1.

In an embodiment, lower calibration accuracy might be acceptable, wherein the spectrum REFSPEC2 may deviate e.g. less than 5% from linearity in a first spectral range, which comprises the spectral position $\lambda_0$, and e.g. less than 5% in a second spectral range, which comprises the spectral position $\lambda_1$. If three transmission peaks are used, the deviation from linearity may also be less than 5% in a third spectral range, which comprises the spectral position $\lambda_2$. Each spectral range may be equal to five times the width $\Delta\lambda_{FWHM,n}$ of the spectral peak PEAK1.

Figure 11:
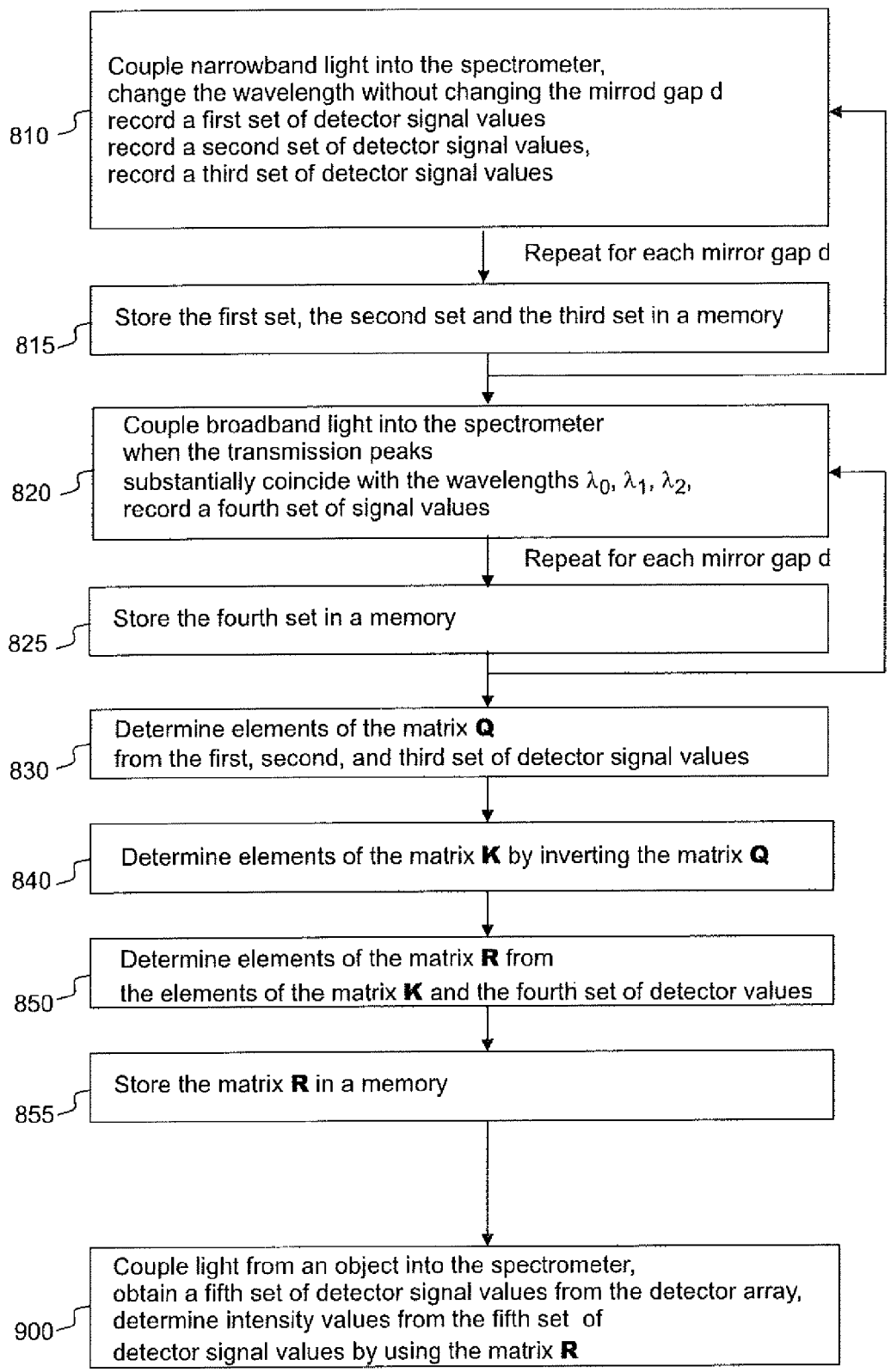
FIG. 11 shows method steps for carrying out intensity calibration and spectral analysis.

FIG. 11 shows method steps for carrying out calibration of the spectrometer 500 and for measuring intensity values by using the spectrometer 500.

In step 810, narrowband light LB11 having the (single) spectral peak MPEAK may be coupled to the image sensor 200 via the interferometer 100.

A first set of detector values $S_R(\lambda_0), S_G(\lambda_0), S_B(\lambda_0)$ may be obtained by scanning the wavelength $\lambda_M$ of the calibration peak MPEAK is over a range, which contains the spectral position $\lambda_0$ of the first transmission peak PEAK1 of the Fabry-Perot interferometer.

A second set of detector values $S_R(\lambda_1), S_G(\lambda_1), S_B(\lambda_1)$ may be obtained by scanning the wavelength $\lambda_M$ of the calibration peak MPEAK is over a range, which contains the spectral position $\lambda_1$ of the second transmission peak PEAK2 of the Fabry-Perot interferometer.

If a third transmittance peak PEAK3 is (optionally) utilized, a third set of detector values $S_R(\lambda_2), S_G(\lambda_2), S_B(\lambda_2)$ may be obtained by scanning the wavelength $\lambda_M$ of the calibration peak MPEAK is over a range, which contains the spectral position $\lambda_2$ of the second transmission peak PEAK3 of the Fabry-Perot interferometer.

The step 810 may comprise scanning the wavelength of the calibration peak MPEAK over a spectral range. The spectral range may be e.g. from 500 nm to 900 nm or from 400 nm to 1000 nm. The scanning step may be e.g. in the range of 0.1 nm to 10 nm.

In step 815, the first set, the second set and the third set of values may be stored in a memory.

The mirror gap d may be scanned over a range, and the steps 810 and 815 may be repeated for each mirror gap value d.

In step 820, broadband light LB20 may be coupled to the image sensor 200 via the interferometer 100.

A fourth set of detector values $S_R(d)$, $S_G(d)$, $S_B(d)$ may be obtained from the image sensor 200 at least when the mirror gap value d is equal to the mirror gap value used in step 810.

In step 825, the fourth set of detector signal values $S_R(d)$, $S_G(d)$, $S_B(d)$ may be stored in a memory.

The step 820 may be repeated for several different mirror gap values d. In particular, the mirror gap d may be scanned over a range.

In an embodiment, the step 820 may be carried out before carrying out the step 810. In other words, calibration measurement with the broadband light may take place before calibration measurements with the narrowband light.

In step 830, the parameters $Q_{Rn}$, $Q_{Gn}$, $Q_{Rn}$, $Q_{Gn}$, $Q_{Bn}$ $Q_{Rn+1}$, $Q_{Gn+1}$, $Q_{Bn+1}$ $Q_{Rn+2}$, $Q_{Gn+2}$, $Q_{Bn+2}$ (or only $Q_{Rn}$, $Q_{Gn}$, $Q_{Rn+1}$, $Q_{Gn+1}$) may be determined from the detector values $S_R(\lambda_0)$, $S_G(\lambda_0)$ $S_B(\lambda_0)$, $S_R(\lambda_1)$, $S_G(\lambda_1)$ $S_B(\lambda_1)$, $S_R(\lambda_2)$, $S_G(\lambda_2)$ $S_B(\lambda_2)$ and from the known intensity values $B(\lambda_0)$, $B(\lambda_1)$, $B(\lambda_2)$ of the narrowband calibration light LB11. For example, the equations (11a) to (11i) or the equations (12a) to (12i) may be used.

In step 840, the matrix K may be determined by inverting the matrix Q, by using the equation (6)).

In step 850, the correction matrix A and/or the decomposing matrix R may be determined from the fourth set of detector signal values $S_R(d)$, $S_G(d)$, $S_B(d)$, from the known intensity values $A_n$, $A_{n+1}$, $A_{n+2}$ of the broadband calibration light LB20, and from the matrix K.

In step 855, the matrix A and/or the matrix R may be stored in a memory.

At a later stage, unknown intensity values $X_n$, $X_{n+1}$, $X_{n+2}$ may be measured by coupling light of an object OBJ1 to the spectrometer 500 in step 900. The intensity values $X_n$, $X_{n+1}$, $X_{n+2}$ may be determined from the detector signal values $S_R$, $S_G$, $S_B$ by using the decomposing matrix R. Intensity values $X_n$, $X_{n+1}$, $X_{n+2}$ may be determined for two or more different image portions $SUB_{1,1}$, $SUB_{i,j}$, $SUB_{MAXi,MAXj}$ (See FIG. 4). In particular, intensity values $X_n$, $X_{n+1}$, $X_{n+2}$ may be determined for two or more different image portions $SUB_{1,1}$, $SUB_{i,j}$, $SUB_{MAXi,MAXj}$ without changing the orientation of the spectrometer 500.

In an embodiment, calibration may also be carried out after detector signals associated with an unknown spectrum have been measured and stored in a memory. In other words, detector signal values may be stored in a memory as such, and the intensity values may be calculated from the previously recorded detector signals at a later stage, after the decomposing matrix R has been determined.

Figure 12A:
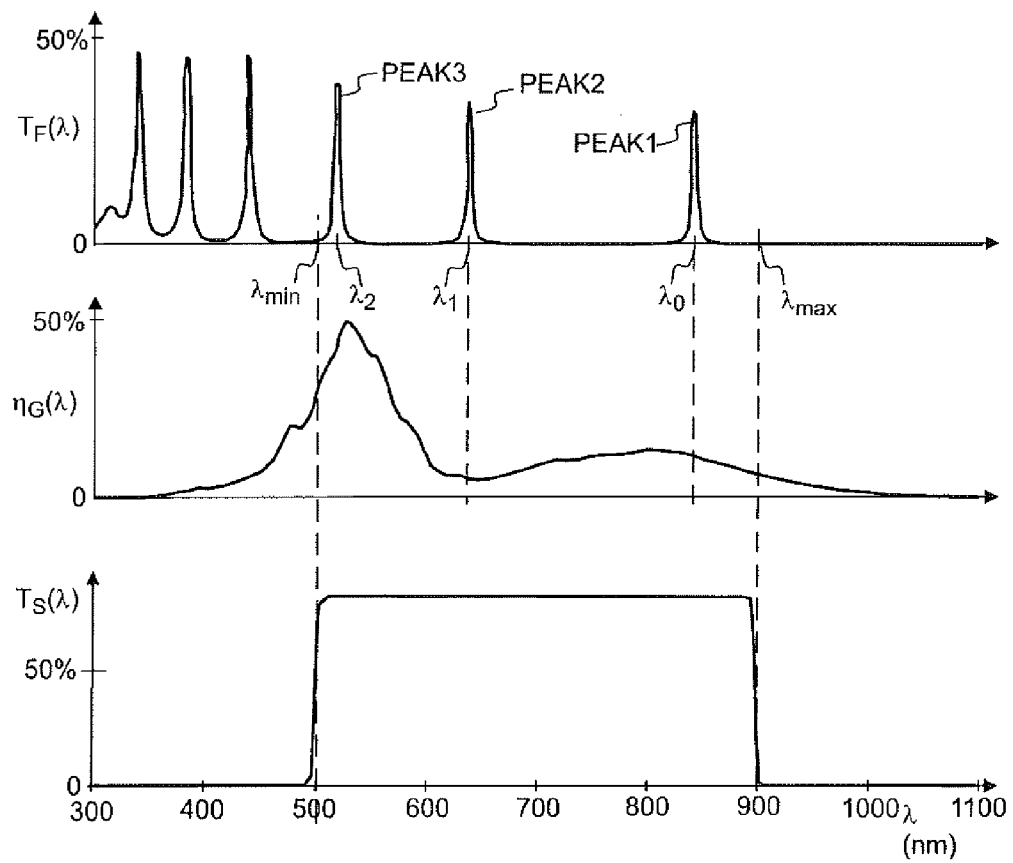
FIG. 12a shows transmission peaks of the interferometer and the sensitivity function of a detector pixel.
Figure 12B:
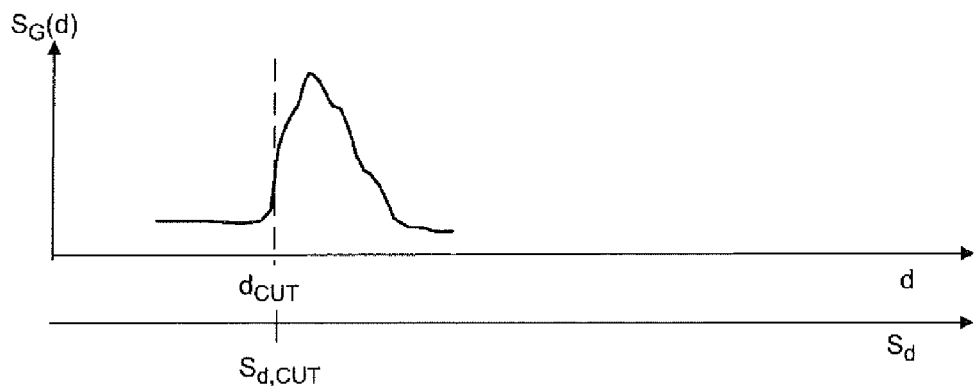
FIG. 12b shows signal values of a detector pixel as a function of mirror gap when using broadband light.

Referring to FIGS. 12a and 12b, correct mapping between feedback signal values $S_d$ (e.g. sensor capacitance values) and the spectral positions of the transmission peaks PEAK1, PEAK2, PEAK3 may be checked and/or calibrated by coupling broadband light into the spectrometer, by defining a cut-off wavelength ($\lambda_{min}$, $\lambda_{max}$) with one or more cut-off filters 410, 420, by adjusting the mirror gap d, and by monitoring a detector signal $S_R$, $S_G$, or $S_B$ as a function of the feedback signal $S_d$. For example, reducing the mirror gap d may cause shifting of the transmission peaks PEAK1, PEAK2, PEAK3 towards the cut-off wavelength $\lambda_{min}$. The detector signal (e.g. $S_G$) may exhibit a sudden change when a transmission peak (e.g. PEAK3) of the interferometer 100 starts to overlap the cut-off wavelength $\lambda_{min}$ (or $\lambda_{max}$). Thus, a feedback signal value $S_d$ or a mirror gap value $d_{CUT}$ associated with said sudden change may also be associated with the cut-off wavelength $\lambda_{min}$ (or $\lambda_{max}$).

This kind of wavelength calibration or verification of the spectral position may be carried out e.g. by using the same broadband light LB20, which is used during the second phase of the intensity calibration. However, the wavelength calibration or verification may carried out by using other light, which has a broadband component in the vicinity of the cut-off wavelength $\lambda_{min}$ and/or $\lambda_{max}$. For example broadband light LB1 emitted from the object OBJ1 may be used. The cut-off wavelength $\lambda_{min}$, $\lambda_{max}$ may be defined by a filter 410, 420 of the spectrometer 500 or by an external filter.

The method may comprise:

defining a cut-off wavelength ($\lambda_{min}$, $\lambda_{max}$) of calibration light (LB20) with an optical filter, coupling broadband light (LB20) to the spectrometer (500), adjusting the mirror gap (d), and monitoring a detector signal ($S_G$) as a function of the mirror gap (d) and/or as a function of the feedback signal value ($S_d$) in order to determine a mirror gap value ($d_{CUT}$) and/or a feedback signal value ($S_{d,CUT}$) associated with the cut-off wavelength ($\lambda_{min}$, $\lambda_{max}$).

For wavelength calibration or verification, the filter 410, 420 may be selected such that the spectral transmittance $T(\lambda)$ of the filter 410, 420 exhibits a sudden transition in the vicinity of the cut-off wavelength $\lambda_{min}$, $\lambda_{max}$, in order to maximize the corresponding change of the detector signal $S_R$, $S_G$, $S_B$ when the mirror gap is changed in the vicinity of the value $d_{CUT}$. The slope $\Delta T(\lambda)/\Delta\lambda$ of the transmittance curve of the filter 410, 420 at the cut-off wavelength $\lambda_{min}$, $\lambda_{max}$ may be e.g. higher than 20%/nm. The cut-off wavelength $\lambda_{min}$ may also be called as the cut-on wavelength $\lambda_{min}$.

The spectrometer 500 may be scanned over the free spectral range FSR by changing the mirror gap d from a first value $d_1$ to a second value $d_2$. The calibration may be performed for each relevant mirror gap value d between the first value $d_1$ and the second value $d_2$. The matrix Q may be determined for each relevant mirror gap value d between the first value $d_1$ and the second value $d_2$. In an embodiment, the spectral sensitivities $\eta_R(\lambda)$, $\eta_G(\lambda)$, $\eta_B(\lambda)$ may be selected such that the matrix Q is invertible for each mirror gap value d between the first value $d_1$ and the second value $d_2$.

The interferometer 100 and the image sensor 200 of the spectrometer 500 may be implemented e.g. in a first mobile unit. Determining intensity values from detector signals may be carried out in the first mobile unit. Determining intensity values from detector signals may also be carried out in a second mobile or stationary unit, which is separate from the first unit.

The spectrometer 500 may be used e.g. for remote sensing applications where it may have high transmittance at the wavelength bands selected for imaging. The spectrometer 500 may be used e.g. for monitoring spatial variations of color of an object. The spectrometer 500 may be used e.g. for absorption measurement, where a first transmission peak PEAK1 is matched with an absorption band and a second transmission peak PEAK2 is matched with a reference band. The spectrometer 500 may be used e.g. for absorption measurement, where a first transmission peak PEAK1 is matched with fluorescent light and a second transmission peak PEAK2 is matched with the illuminating light, which induces the fluorescence.

When measuring the spectrum of an object OBJ1, the object OBJ1 may be optionally illuminated by broadband light and/or by narrowband light. Narrowband light may also be obtained e.g. from a light emitting diode or from a laser. Illuminating by Narrowband light may further improve spectral resolution when using the spectrometer 500.

The term "light" may refer to electromagnetic radiation in the ultraviolet, visible and/or infrared regime.

Various aspects of the present disclosure are illustrated by the following examples:

Example 1

A method for determining calibration parameters for a spectrometer (500), wherein the spectrometer (500) comprises a Fabry-Perot interferometer (100) having an adjustable mirror gap (d), and an image sensor (200), the image sensor (200) comprises a plurality of first pixels (P1) and a plurality of second pixels (P2), the pixels (P1, P2) are arranged to detect light (LB2) transmitted through the Fabry-Perot interferometer (100), the first pixels (P1) have a first sensitivity function ($\eta_R(\lambda)$), the second pixels (P2) have a second different sensitivity function ($\eta_G(\lambda)$), the Fabry-Perot interferometer (100) has a first transmission peak (PEAK1) and a second transmission peak (PEAK2), the first pixels (P1) are arranged to detect light at the spectral position ($\lambda_0$) of the first transmission peak (PEAK1) and the at the spectral position ($\lambda_1$) of the second transmission peak (PEAK2), the method comprising:

providing first calibration light (LB11), which has a reference spectral peak (MPEAK) at an adjustable spectral position ($\lambda_M$), obtaining first detector signal values ($S_R$, $S_G$) from the image sensor (200) by coupling the first calibration light (LB11) into the spectrometer (500) when the reference spectral peak (MPEAK) is substantially at a first spectral position ($\lambda_0$), obtaining second detector signal values ($S_R$, $S_G$) from the image sensor (200) by coupling the first calibration light (LB11) into the spectrometer (500) when the reference spectral peak (MPEAK) is substantially at a second spectral position ($\lambda_1$), determining a first group (Q) of calibration parameters from the first detector signal values ($S_R$, $S_G$) and from the second detector signal values ($S_R$, $S_G$), providing second calibration light (LB20), wherein the spectral width ($\Delta\lambda_{FWHM,20}$) of a spectral band of the second calibration light (LB20) is broader than the spectral width ($\Delta\lambda_{FWHM,M}$) of the reference spectral peak (MPEAK), obtaining third detector signal values ($S_R$, $S_G$) from the image sensor (200) by coupling the second calibration light (LB20) into the spectrometer (500), and determining a second group (R) of calibration parameters from the third detector signal values ($S_R$, $S_G$) and from the first group of calibration parameters (Q).

Example 2

The method of example 1 comprising obtaining a set of detector signal values from the image sensor (200) by scanning the spectral position ($\lambda_M$) of the reference spectral peak (MPEAK) over a spectral range (RNG1), which comprises the first spectral position ($\lambda_0$), and summing said set of detector signal values.

Example 3

The method of example 1 comprising obtaining a set of detector signal values from the image sensor (200) by scanning the spectral position ($\lambda_0$) of the first transmission peak (PEAK1) over a spectral range (RNG1), which comprises the spectral position ($\lambda_M$) of the reference spectral peak (MPEAK), and summing said set of detector signal values.

Example 4

The method according to any of the examples 1 to 3 wherein the first calibration light (LB11) is provided by filtering light of a broadband light source (SRC1) by using a monochromator (FIL1).

Example 5

The method according to any of the examples 1 to 4 comprising forming a first matrix (Q) from said first group of calibration parameters, determining a second matrix (K) by inverting the first matrix (Q), and determining the second group (R) of calibration parameters from the second matrix (K) and said third detector signal values ($S_R$, $S_G$).

Example 6

The method according to any of the examples 1 to 5 wherein a spectral band (REFSPEC2) of the second calibration light (LB20) includes the first spectral position ($\lambda_0$), and wherein the spectral width ($\Delta\lambda_{FWHM,20}$) of the spectral band is substantially broader than spectral width ($\Delta\lambda_{FWHM,n}$) of the first transmission peak (PEAK1).

Example 7

The method according to any of the examples 1 to 6 comprising obtaining fourth detector signal values ($S_R$, $S_G$) from the image sensor (200) by forming an image (IMG1) of an object (OBJ1) on the image sensor (200), and determining intensity values ($\lambda_e$, $X_{n+1}$) from the fourth detector signal values ($S_R$, $S_G$) by using the second group (R) of calibration parameters.

Example 8

The method of example 7 comprising comparing an intensity value ($\lambda_n$) with a reference value or comparing a ratio of intensity values ($X_n/X_{n+1}$) with a reference value.

Example 9

The method according to any of the examples 1 to 8 comprising:

defining a cut-off wavelength ($\lambda_{min}$, $\lambda_{max}$) with an optical filter, coupling light (LB20) into the spectrometer (500), adjusting the mirror gap (d), and monitoring the detector signal ($S_G$) as a function of the mirror gap (d) in order to determine a feedback signal value ($S_{d,CUT}$) associated with the cut-off wavelength ($\lambda_{min}$, $\lambda_{max}$)

and/or in order to determine a mirror gap value ($d_{CUT}$) associated with the cut-off wavelength a ($\lambda_{min}$, $\lambda_{max}$).

Example 10

A computer program (PROG2) which when executed by at least one data processor (CNT2) is for carrying out the method according to any of the examples 1 to 9.

Example 11

A computer-readable medium (MEM7) storing computer program (PROG2) which when executed by at least one data processor (CNT2) is for carrying out the method according to any of the examples 1 to 9.

For the person skilled in the art, it will be clear that modifications and variations of the devices and methods according to the present disclosure are perceivable. The figures are schematic. The particular embodiments described above with reference to the accompanying drawings are illustrative only and not meant to limit the scope of the present disclosure, which is defined by the appended claims.

The invention claimed is:

1. A method for determining calibration parameters for a spectrometer, wherein the spectrometer comprises a Fabry-Perot interferometer having an adjustable mirror gap, and an image sensor, the image sensor comprises a plurality of first pixels and a plurality of second pixels, the pixels are arranged to detect light transmitted through the Fabry-Perot interferometer, the first pixels have a first sensitivity function, the second pixels have a second different sensitivity function, the Fabry-Perot interferometer has a first transmission peak and a second transmission peak, the first pixels are arranged to detect light at the spectral position of the first transmission peak and the at the spectral position of the second transmission peak, the method comprising:
  providing first calibration light, which has a reference spectral peak at an adjustable spectral position,
  obtaining first detector signal values from the image sensor by coupling the first calibration light into the spectrometer when the reference spectral peak is substantially at a first spectral position,
  obtaining second detector signal values from the image sensor by coupling the first calibration light into the spectrometer when the reference spectral peak is substantially at a second spectral position,
  determining a first group of calibration parameters from the first detector signal values and from the second detector signal values,
  providing second calibration light, wherein the spectral width of a spectral band of the second calibration light is broader than the spectral width of the reference spectral peak,
  obtaining third detector signal values from the image sensor by coupling the second calibration light into the spectrometer, and
  determining a second group of calibration parameters from the third detector signal values and from the first group of calibration parameters.

2. The method of claim 1 comprising obtaining a set of detector signal values from the image sensor by scanning the spectral position of the reference spectral peak over a spectral range, which comprises the first spectral position, and summing said set of detector signal values.

3. The method of claim 1 comprising obtaining a set of detector signal values from the image sensor by scanning the spectral position of the first transmission peak over a spectral range, which comprises the spectral position of the reference spectral peak, and summing said set of detector signal values.

4. The method according to the claim 1 wherein the first calibration light is provided by filtering light of a broadband light source by using a monochromator.

5. The method according to the claim 1 comprising forming a first matrix from said first group of calibration parameters, determining a second matrix by inverting the first matrix, and determining the second group of calibration parameters from the second matrix and from said third detector signal values.

6. The method according to the claim 1 wherein a spectral band of the second calibration light includes the first spectral position, and wherein the spectral width of the spectral band of the second calibration light is substantially broader than spectral width of the first transmission peak.

7. The method according to the claim 1 comprising obtaining fourth detector signal values from the image sensor by forming an image of an object on the image sensor, and determining intensity values from the fourth detector signal values by using the second group of calibration parameters.

8. The method of claim 7 comprising comparing an intensity value with a reference value.

9. The method of claim 7 comprising comparing a ratio of intensity values with a reference value.

10. The method according to the claim 1 comprising:
  defining a cut-off wavelength with an optical filter,
  coupling light into the spectrometer,
  adjusting the mirror gap, and
  monitoring the detector signal as a function of the mirror gap in order to determine a feedback signal value associated with the cut-off wavelength.

11. The method according to the claim 1 comprising:
  defining a cut-off wavelength with an optical filter,
  coupling light into the spectrometer,
  adjusting the mirror gap, and
  monitoring the detector signal as a function of the mirror gap in order to determine a mirror gap value associated with the cut-off wavelength.

12. A computer program product embodied on a non-transitory computer readable medium, comprising computer program code for determining calibration parameters of a spectrometer, wherein the spectrometer comprises a Fabry-Perot interferometer having an adjustable mirror gap, and an image sensor, the image sensor comprises a plurality of first pixels and a plurality of second pixels, the pixels are arranged to detect light transmitted through the Fabry-Perot interferometer, the first pixels have a first sensitivity function, the second pixels have a second different sensitivity function, the Fabry-Perot interferometer has a first transmission peak and a second transmission peak, the first pixels are arranged to detect light at the spectral position of the first transmission peak and the at the spectral position of the second transmission peak,
  wherein the computer program code is configured to, when executed on at least one processor, cause an apparatus or a system to:
    provide first calibration light, which has a reference spectral peak at an adjustable spectral position,
    obtain first detector signal values from the image sensor by coupling the first calibration light into the spectrometer when the reference spectral peak is substantially at a first spectral position,
    obtain second detector signal values from the image sensor by coupling the first calibration light into the spectrometer when the reference spectral peak is substantially at a second spectral position, determine a first group of calibration parameters from the first detector signal values and from the second detector signal values, provide second calibration light, wherein the spectral width of a spectral band of the second calibration light is broader than the spectral width of the reference spectral peak, obtain third detector signal values from the image sensor by coupling the second calibration light into the spectrometer, and determine a second group of calibration parameters from the third detector signal values and from the first group of calibration parameters.

\* \* \* \* \*